United States Patent
Kim et al.

(10) Patent No.: US 11,323,965 B2
(45) Date of Patent: May 3, 2022

(54) METHOD FOR TRANSMITTING OR RECEIVING FRAME IN WIRELESS LAN, AND DEVICE THEREFOR

(71) Applicant: LG Electronics Inc., Seoul (KR)

(72) Inventors: Jeongki Kim, Seoul (KR); Suhwook Kim, Seoul (KR); Kiseon Ryu, Seoul (KR); Jinsoo Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 36 days.

(21) Appl. No.: 16/629,282

(22) PCT Filed: Jul. 9, 2018

(86) PCT No.: PCT/KR2018/007737
§ 371 (c)(1),
(2) Date: Jan. 7, 2020

(87) PCT Pub. No.: WO2019/009683
PCT Pub. Date: Jan. 10, 2019

(65) Prior Publication Data
US 2020/0163021 A1 May 21, 2020

Related U.S. Application Data

(60) Provisional application No. 62/575,542, filed on Oct. 23, 2017, provisional application No. 62/573,167, (Continued)

(51) Int. Cl.
*G08C 17/00* (2006.01)
*H04W 52/02* (2009.01)

(52) U.S. Cl.
CPC .............. *H04W 52/0235* (2013.01)

(58) Field of Classification Search
CPC . H04W 84/12; H04W 52/0235; H04W 52/02; Y02D 30/70
(Continued)

(56) References Cited

U.S. PATENT DOCUMENTS

2011/0058510 A1* 3/2011 Thomas ............ H04W 52/0216
370/311
2014/0293829 A1* 10/2014 Visuri ............... H04M 15/8351
370/254

(Continued)

FOREIGN PATENT DOCUMENTS

| KR | 20110069671 | 6/2011 |
| KR | 20140053857 | 5/2014 |

(Continued)

*Primary Examiner* — Mahendra R Patel
(74) *Attorney, Agent, or Firm* — Fish & Richardson P.C.

(57) ABSTRACT

A method by which a station (STA) receives a frame in a wireless (WLAN) according to an embodiment of the present disclosure includes: receiving a first wake-up frame through wake-up radio (WUR); monitoring primary connectivity radio (PCR) according to reception of the first wake-up frame; and receiving a PCR beacon frame through the PCR, wherein the STA maintains monitoring of the WUR for a predetermined period while monitoring the PCR and ends monitoring of the WUR when the STA detects a second wake-up frame indicating transmission of unicast data through the WUR or succeeds in transmitting an uplink (UL) PCR frame to an access point (AP) even before the predetermined period has elapsed.

14 Claims, 25 Drawing Sheets

Related U.S. Application Data filed on Oct. 17, 2017, provisional application No. 62/539,551, filed on Aug. 1, 2017, provisional application No. 62/529,490, filed on Jul. 7, 2017.

(58) Field of Classification Search
USPC .......................................................... 370/311
See application file for complete search history.

(56) References Cited

U.S. PATENT DOCUMENTS

| | | | |
|---|---|---|---|
| 2017/0006034 A1* | 1/2017 | Link, II | H04L 61/2514 |
| 2017/0026907 A1* | 1/2017 | Min | H04W 52/0216 |
| 2017/0181088 A1* | 6/2017 | Kim | H04W 12/06 |
| 2017/0195954 A1* | 7/2017 | Ghosh | H04W 28/0221 |
| 2017/0280498 A1* | 9/2017 | Min | H04L 5/0053 |
| 2018/0019902 A1* | 1/2018 | Suh | H04L 27/2602 |
| 2018/0049131 A1* | 2/2018 | Huang | H04W 52/0248 |
| 2018/0092034 A1* | 3/2018 | Huang | H04W 52/0229 |
| 2018/0103430 A1* | 4/2018 | He | H04W 48/16 |
| 2018/0184377 A1* | 6/2018 | Kenney | H04W 4/80 |
| 2018/0234918 A1* | 8/2018 | Asterjadhi | H04W 52/0229 |
| 2018/0255422 A1* | 9/2018 | Montemurro | H04W 52/0212 |
| 2018/0310249 A1* | 10/2018 | Wilhelmsson | H04W 52/0241 |
| 2018/0317172 A1* | 11/2018 | Lepp | H04W 68/005 |
| 2020/0084720 A1* | 3/2020 | Marin | H04W 72/0446 |

FOREIGN PATENT DOCUMENTS

| | | | | |
|---|---|---|---|---|
| KR | 20140053857 A | * | 5/2014 | .......... H04M 1/2535 |
| KR | 20140054071 | | 5/2014 | |
| KR | 20140054071 A | * | 5/2014 | ........ H04W 52/0216 |
| KR | 20150121168 | | 10/2015 | |
| KR | 20150121168 A | * | 10/2015 | ............ H04W 48/14 |
| KR | 20160068090 | | 6/2016 | |
| KR | 20160068090 A | * | 6/2016 | |

\* cited by examiner (a)

(b)

(a)

(b)

METHOD FOR TRANSMITTING OR RECEIVING FRAME IN WIRELESS LAN, AND DEVICE THEREFOR

CROSS-REFERENCE TO RELATED APPLICATIONS

This application is a National Stage application under 35 U.S.C. § 371 of International Application No. PCT/KR2018/007737, filed on Jul. 9, 2018, which claims the benefit of U.S. Provisional Applications No. 62/529,490 filed on Jul. 7, 2017, No. 62/539,551 filed on Aug. 1, 2017, No. 62/573,167 filed on Oct. 17, 2017, and No. 62/575,542 filed on Oct. 23, 2017. The disclosures of the prior applications are incorporated by reference in their entirety.

TECHNICAL FIELD

The present disclosure relates to a wireless LAN, and more specifically, to a method for transmitting or receiving frames through wake-up radio (WUR) or primary connectivity radio (PCR) and a device therefore.

BACKGROUND ART

IEEE (Institute of Electrical and Electronics Engineers) 802.11 is developed as standards for wireless LAN technology. IEEE 802.11a and 11b use unlicensed bands, IEEE 802.11b provides a transmission speed of 11 Mbps and IEEE 802.11a provides a transmission speed of 54 Mbps. IEEE 802.11g provides a transmission speed of 54 Mbps using orthogonal frequency-division multiplexing (OFDM) at 2.4 GHz. IEEE 802.11n provides a transmission speed of 300 Mbps for four spatial streams using multiple input multiple output-OFDM (MIMO-OFDM). IEEE 802.11n supports up to 40 MHz channel bandwidth. In this case, a transmission speed of 600 Mbps is provided.

The aforementioned wireless LAN standards use a maximum bandwidth of 160 MHz, and IEEE 802.11ax standardization developed from IEEE 802.11ac which supports eight spatial streams to support up to 1 Gbit/s is under discussion.

DESCRIPTION

Technical Problem

An object of the present disclosure is to provide a method for transmitting/receiving PCR unicast data generated after a wake-up frame more efficiently and correctly and a device therefor.

The present disclosure is not limited to the aforementioned technical task and other technical tasks can be inferred from embodiments of the present disclosure.

Technical Solution

To accomplish the aforementioned object, a method by which a station (STA) receives a frame in a wireless (WLAN) according to one aspect of the present disclosure includes: receiving a first wake-up frame through wake-up radio (WUR); monitoring primary connectivity radio (PCR) according to reception of the first wake-up frame; and receiving a PCR beacon frame through the PCR, wherein the STA maintains monitoring of the WUR for a predetermined period while monitoring the PCR and ends monitoring of the WUR when the STA detects a second wake-up frame indicating transmission of unicast data through the WUR or succeeds in transmitting an uplink (UL) PCR frame to an access point (AP) even before the predetermined period has elapsed.

To accomplish the aforementioned object, a station (STA) according to another aspect of the present disclosure includes: a wake-up radio (WUR) receiver; a primary connectivity radio (PCR) transceiver; and a processor configured to receive a first wake-up frame through the WUR receiver, to monitor PCR through the PCR transceiver according to reception of the first wake-up frame and to receive a PCR beacon frame through the PCR transceiver, wherein the processor maintains monitoring of the WUR for a predetermined period while monitoring the PCR and ends monitoring of the WUR when the processor detects a second wake-up frame indicating transmission of unicast data through the WUR or succeeds in transmitting an uplink (UL) PCR frame to an access point (AP) even before the predetermined period has elapsed.

The duration of the predetermined period may be determined through a negotiation between the STA and the AP.

The second wake-up frame may be used for the unicast data generated between the first wake-up frame and the PCR beacon frame, and the STA may receive the unicast data through the PCR when the second wake-up frame is detected.

The STA may determine that the UL PCR frame has been successfully transmitted when the STA receives a response frame for the UL PCR frame.

The STA may operate in a WUR duty cycle mode in which a WUR on duration and a WUR off duration are alternately repeated and perform the monitoring of the WUR according to the WUR duty cycle mode.

The first wake-up frame may be a broadcast wake-up frame.

The second wake-up frame may be one of an individually addressed wake-up frame including a WUR ID allocated to the STA in an addressed field, a group wake-up frame including a group ID (GID) allocated to a group including the STA in the addressed field, and a wake-up frame including multiple WUR IDs in a frame body.

The UL PCR frame may be a PS-poll frame or a QoS null frame.

To accomplish the aforementioned object, a method by which an access point (AP) transmits a frame in a WLAN according to another aspect of the present disclosure includes: transmitting a first wake-up frame through wake-up radio (WUR); and transmitting a PCR beacon frame to a station (STA) waking up according to transmission of the first wake-up frame through primary connectivity radio (PCR), wherein, when unicast data to be transmitted to the STA is generated between the first wake-up frame and the PCR beacon frame, the AP transmits a second wake-up frame to the STA waking up and monitoring the PCR through the WUR.

To accomplish the aforementioned object, An access point (AP) according to another aspect of the present disclosure includes: a transceiver; and a processor configured to transmit a first wake-up frame through wake-up radio (WUR) by controlling the transceiver and to transmit a PCR beacon frame to a station (STA) waking up according to transmission of the first wake-up frame through primary connectivity radio (PCR), wherein, when unicast data to be transmitted to the STA is generated between the first wake-up frame and the PCR beacon frame, the processor transmits a second wake-up frame to the STA waking up and monitoring the PCR through the WUR.

The AP may negotiate with the STA about an operation of the STA to maintain the WUR monitoring while monitoring the PCR for a predetermined period after wake-up before entering a WUR mode.

The AP may consider that the STA ends monitoring of the WUR when the AP transmits the second wake-up frame or responds to an uplink (UL) PCR frame received from the STA even before the predetermined period has elapsed.

The AP may transmit the unicast data to the STA through the PCR after transmission of the second wake-up frame.

When the STA operates in a WUR duty cycle mode in which a WUR on duration and a WUR off duration are alternately repeated, the AP may transmit the second wake-up frame when the STA is in the WUR on duration.

The first wake-up frame may be a broadcast wake-up frame.

The second wake-up frame may be one of an individually addressed wake-up frame including a WUR ID allocated to the STA in an addressed field, a group wake-up frame including a group ID (GID) allocated to a group including the STA in the addressed field, and a wake-up frame including multiple WUR IDs in a frame body.

The UL PCR frame may be a PS-poll frame or a QoS null frame.

Advantageous Effects

According to an embodiment of the present disclosure, an AP can signal PCR unicast data generated after a wake-up frame through WUR in a state in which whether an STA turns on PCR cannot be confirmed because the STA that has turned on PCR monitors WUR for a predetermined period of time, and thus transmission and reception of the PCR unicast data can be performed more efficiently and correctly.

Technical effects in addition to the above-described technical effect can be inferred from embodiments of the present disclosure.

DETAILED DESCRIPTION

Hereinafter, preferred embodiments of the present disclosure will be described in detail with reference to the attached drawings. The detailed description, which will be given below with reference to the accompanying drawings, is intended to explain exemplary embodiments of the present disclosure, rather than to show the only embodiments that can be implemented according to the disclosure.

While the following detailed description includes specific details in order to provide a thorough understanding of the present disclosure, it will be apparent to those skilled in the art that the present disclosure may be practiced without such specific details. In some instances, known structures and devices are omitted, or are shown in a block diagram form focusing on important features of the structures and devices, so as not to obscure the concept of the present disclosure.

As described above, a method for efficiently using a channel having a wide bandwidth in a wireless LAN system and a device therefor will be described below. For this, a wireless LAN system to which the present disclosure is applied will be described in detail first.

Figure 1:
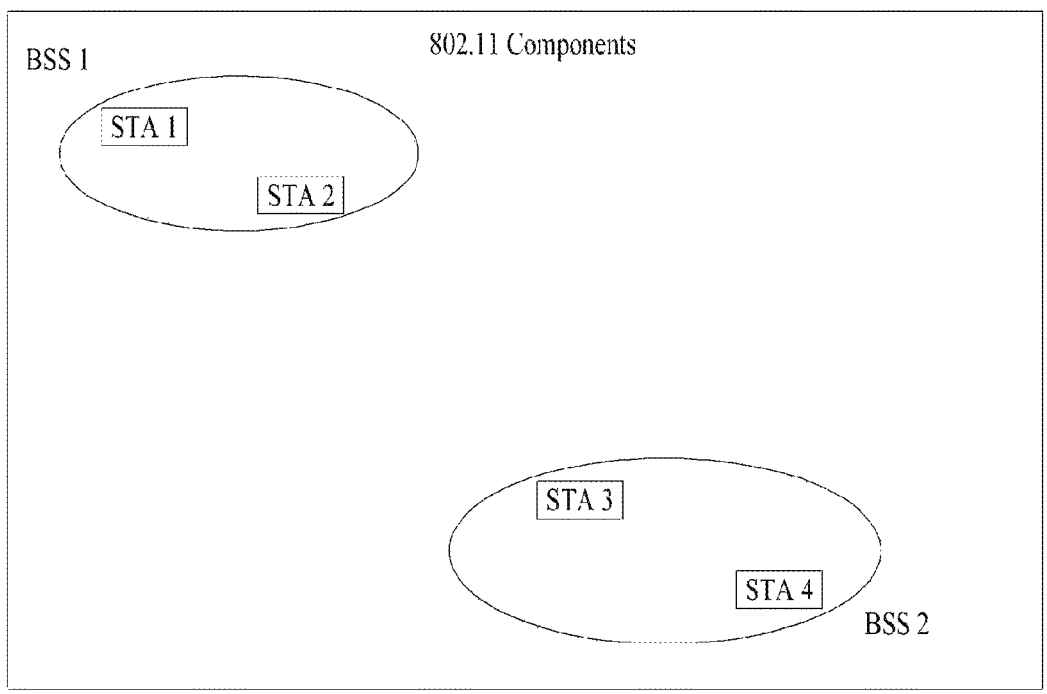
FIG. 1 is a diagram showing an example of a configuration of a wireless LAN system.

FIG. 1 is a diagram showing an example of a configuration of a wireless LAN system.

As illustrated in FIG. 1, the wireless LAN system includes at least one Basic Service Set (BSS). The BSS is a set of stations (STAs) that are able to communicate with each other by successfully performing synchronization.

An STA is a logical entity including a physical layer interface between a Media Access Control (MAC) layer and a wireless medium, and the STA includes an Access Point (AP) and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
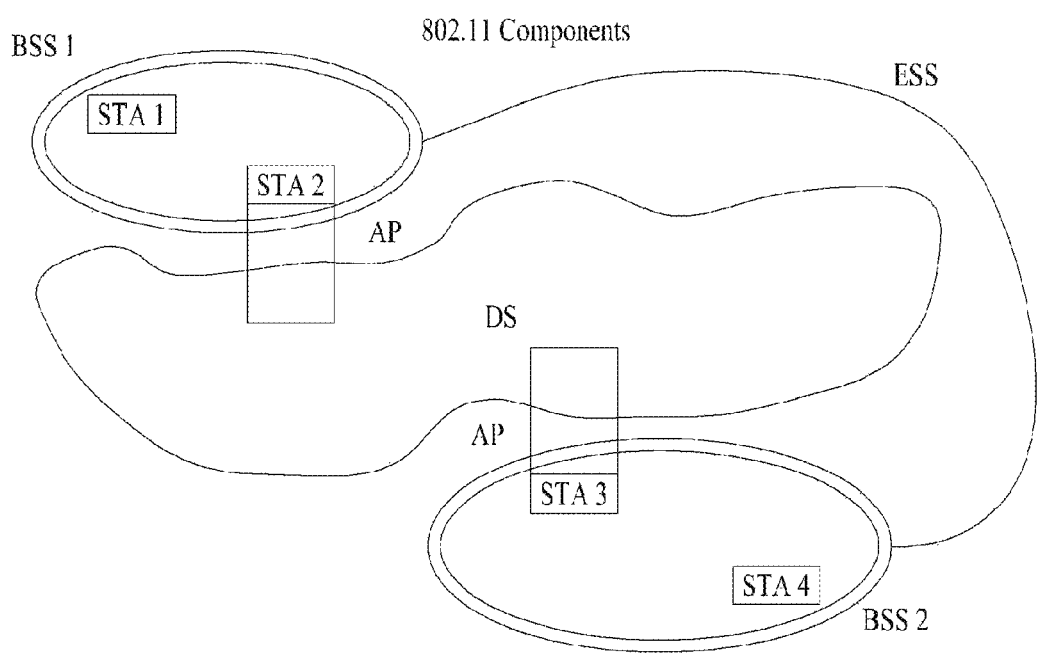
FIG. 2 is a diagram showing another example of a configuration of a wireless LAN system.

FIG. 2 is a diagram illustrating another example of a configuration of a wireless LAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Layer Structure

The operation of an STA operating in a wireless LAN system can be described in terms of a layer structure. The layer structure can be implemented by a processor in terms of device configuration. An STA may have a multi-layer structure. For example, a MAC sublayer and a physical layer (PHY) on a data link layer (DLL) are mainly handled in 802.11. The PHY may include a PLCP (Physical Layer Convergence Procedure) entity, a PMD (Physical Medium Dependent) entity, and the like. The MAC sublayer and PHY conceptually include management entities called an MLME (MAC sublayer Management Entity) and a PLME (Physical Layer Management Entity), respectively. These entities provide a layer management service interface that executes a layer management function.

In order to provide correct MAC operation, an SME (Station Management Entity is present within each STA. The SME is a layer independent entity that can be viewed as residing in a separate management plane or as residing "off to the side." The exact functions of the SME are not specified in this document, but in general this entity can be viewed as being responsible for such functions as the gathering of layer-dependent status from the various layer management entities (LMEs) and similarly setting the value of layer-specific parameters. The SME may typically perform such functions on behalf of general system management entities and implement standard management protocols.

The aforementioned entities interact in various ways. For example, entities can interact by exchanging GET/SET primitives. A primitive refers to a set of elements or parameters related to a specific purpose. XX-GET.request primitive is used to request the value of a given MIB attribute (management information based attribute information). XX-GET.confirm primitive is used to return an appropriate MIB attribute value if status="success," otherwise return an error indication in the Status field. XX-SET.request primitive is used to request that an indicated MIB attribute be set to a given value. If this MIB attribute implies a specific action, then this requests that the action be performed. XX-SET.confirm primitive is used such that, if status="success," this confirms that the indicated MIB attribute was set to the requested value, otherwise it returns an error condition in Status field. If this MIB attribute implies a specific action, then this confirms that the action was performed.

Also, various MLME_GET/SET primitives may be exchanged between MLME and SME via MLME_SAP (Service Access Point). Further, various PLME_GET/SET primitives may be exchanged between PLME and SME via PLME_SAP and between MLME and PLME via MLME-PLME_SAP.

Link Setup Process

Figure 3:
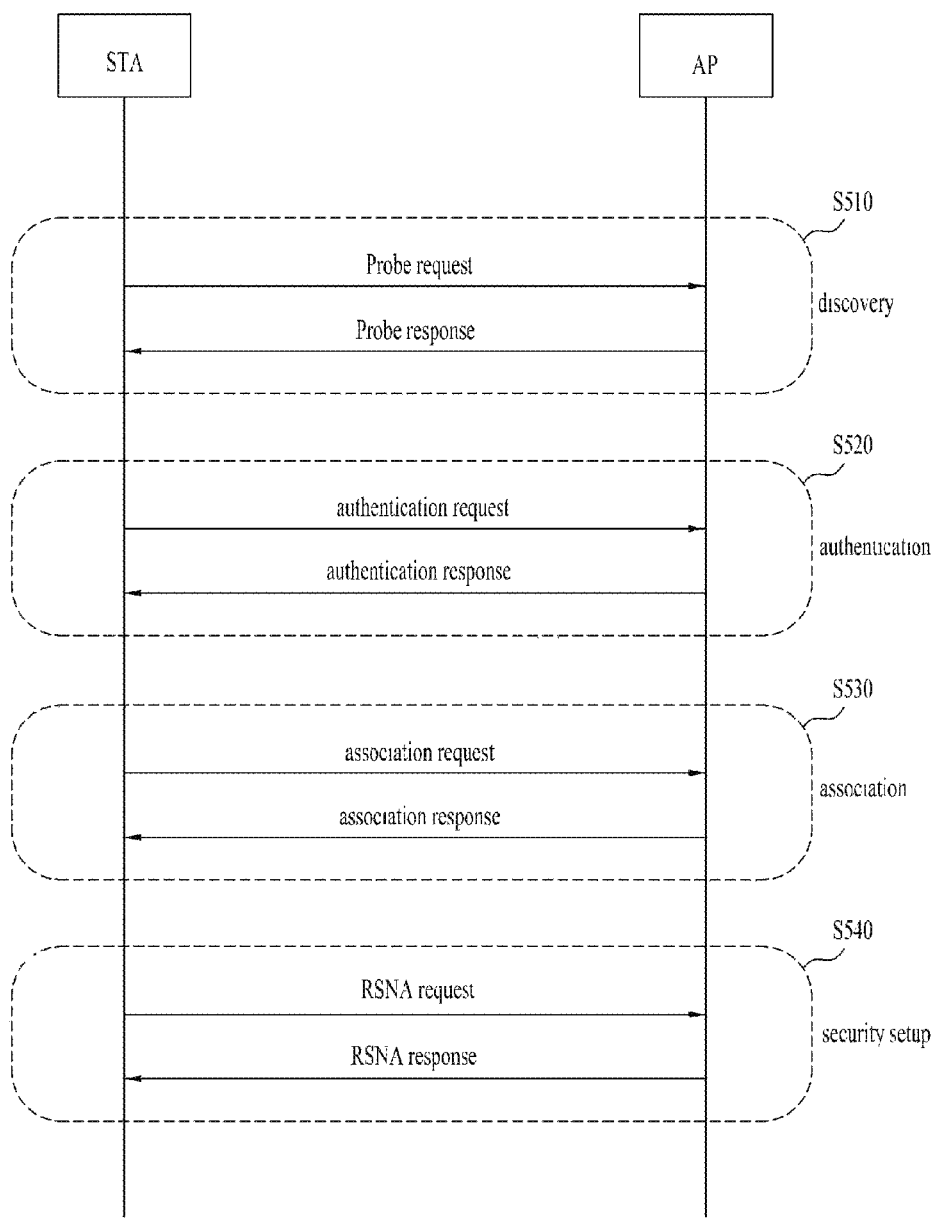
FIG. 3 is a diagram illustrating a general link setup process.

FIG. 3 is a diagram illustrating a general link setup process.

To set up a link for a network and transmit/receive data, an STA needs to discover the network, perform authentication, establish association and perform an authentication process for security. A link setup process may also be referred to as a session initiation process or a session setup process. In addition, discovery, authentication, association and security setting of the link setup process may be collectively referred to as an association process.

An exemplary link setup process will be described with reference to FIG. 3.

An ST performs a network discovery operation in step S510. The network discovery operation may include a scanning operation of the STA. That is, in order to access a network, the STA need to discovery networks in which the STA can participate. The STA needs to identify a compatible network before participating in a wireless network. A process of identifying a network present in a specific area is referred to as scanning.

Scanning includes active scanning and passive scanning.

FIG. 3 illustrates an exemplary network discovery operation including active scanning. The STA that performs active scanning transmits a probe request frame in order to scan neighboring APs while moving between channels and waits for a response thereto. A responder transmits a probe response frame in response to the probe request frame to the STA that has transmitted the probe request frame. Here, the responder may be an STA that has transmitted a final beacon frame in a BSS of a channel that is being scanned. In a BSS, an AP is a responder in a BSS because the AP transmits a beacon frame. In an IBSS, a responder is not fixed because STAs in the IBSS transmit beacon frames by turns. For example, an STA that has transmitted a probe request frame on channel #1 and received a probe response frame on channel #1 may store BSS related information included in the received probe response frame, move to the next channel (e.g., channel #2) and perform scanning (i.e., transmission/reception of a probe request/response on channel #2) through the same method.

Although not shown in FIG. 3, passive scanning may be performed as a scanning operation. An STA that performs passive scanning waits for a beacon frame while moving between channels. A beacon frame is a management frame in IEEE 802.11 and is periodically transmitted to indicate presence of a wireless network and allow an STA performing scanning to discover the wireless network and participate in the wireless network. An AP serves to periodically transmit a beacon frame in a BSS and STAs transmit beacon frames by turns in an IBSS. An STA performing scanning stores information about a BSS included in a beacon frame upon reception of the beacon frame and records beacon frame information in each channel while moving to other channels. The STA that has received a beacon frame may store BSS related information included in the received beacon frame, move to the next channel and perform scanning in the next channel through the same method.

Active scanning has the advantages of less delay and less power consumption as compared to passive scanning.

After the STA discovers the network, the authentication process may be performed in step S520. This authentication process may be referred to as a first authentication process to be clearly distinguished from a security setup process of step S540 which will be described later.

The authentication process includes a process in which the STA transmits an authentication request frame to the AP and the AP transmits an authentication response frame in response thereto to the STA. An authentication frame used for an authentication request/response corresponds to a management frame.

The authentication frame may include information about an authentication algorithm number, an authentication transaction sequence number, status code, challenge text, an RSN (Robust Security Network), a finite cyclic group, and the like. This corresponds to examples of some of information that may be included in the authentication request/response and may be replaced by other types of information or further include additional information.

The STA may transmit the authentication request frame to the AP. The AP may determine whether to permit authentication of the STA on the basis of information included in the received authentication request frame. The AP may provide an authentication processing result to the STA through the authentication response frame.

After successful authentication of the STA, the association process may be performed in step S530. The association process includes a process in which the STA transmits an association request frame to the AP and the AP transmits an association response frame in response thereto to the STA.

For example, the association request frame may include information related to various capabilities and information about a beacon listen interval, an SSID (service set identifier), supported rates, supported channels, an RSN, mobile domains, supported operating classes, a traffic indication map (TIM) broadcast request, interworking service capability, and the like.

For example, the association response frame may include information related to various capabilities and information about status code, an AID (Association ID), supported rates, an EDCA (Enhanced Distributed Channel Access) parameter set, an RCPI (Received Channel Power Indicator), an RSNI (Received Signal to Noise Indicator), mobile domains, a timeout interval (association comeback time), overlapping BSS scan parameters, TIM broadcast response, a QoS map, and the like.

This corresponds to examples of some of information that may be included in association request/response frame and may be replaced by other types of information or further include additional information.

After successful association of the STA with the network, the security setup process may be performed in step S540. The security setup process of step S540 may also be referred to an authentication process through an RSNA (Robust Security Network Association) request/response, the authentication process of step S520 may also be referred to as a first authentication process and the security setup process of step S540 may also be simply referred to as an authentication process.

The security setup process of step S540 may include a private key setup process through 4-way handshaking using an EAPOL (Extensible Authentication Protocol over LAN) frame, for example. Further, the security setup process may be performed according to a security scheme that is not defined in IEEE 802.11.

Medium Access Mechanism

In a wireless LAN system according to IEEE 802.11, the basic access mechanism of medium access control (MAC) is a carrier sense multiple access with collision avoidance (CSMA/CA) mechanism. The CSMA/CA mechanism is also referred to as a distributed coordination function (DCF) of IEEE 802.11 MAC and employs a "listen before talk" access mechanism. According to such an access mechanism, the AP and/or the STA may perform clear channel assessment (CCA) for sensing a radio channel or medium during a predetermined time interval (for example, a DCF inter-frame space (DIFS)) before starting transmission. If it is determined that the medium is in an idle state as the sensed result, frame transmission starts via the medium. If it is determined that the medium is in an occupied state, the AP and/or the STA may set and wait for a delay period (e.g., a random backoff period) for medium access without starting transmission and then attempt to perform frame transmission. Since it is expected that several STAs attempt to perform frame transmission after waiting for different times by applying the random backoff period, it is possible to minimize collision.

In addition, the IEEE 802.11 MAC protocol provides a hybrid coordination function (HCF). The HCF is based on the DCF and a point coordination function (PCF). The PCF refers to a periodic polling method for enabling all reception APs and/or STAs to receive data frames using a polling based synchronous access method. In addition, the HCF has enhanced distributed channel access (EDCA) and HCF controlled channel access (HCCA). The EDCA uses a contention access method for providing data frames to a plurality of users by a provider and the HCCA uses a contention-free channel access method using a polling mechanism. In addition, the HCF includes a medium access mechanism for improving quality of service (QoS) of a WLAN and may transmit QoS data both in a contention period (CP) and a contention free period (CFP).

Figure 4:
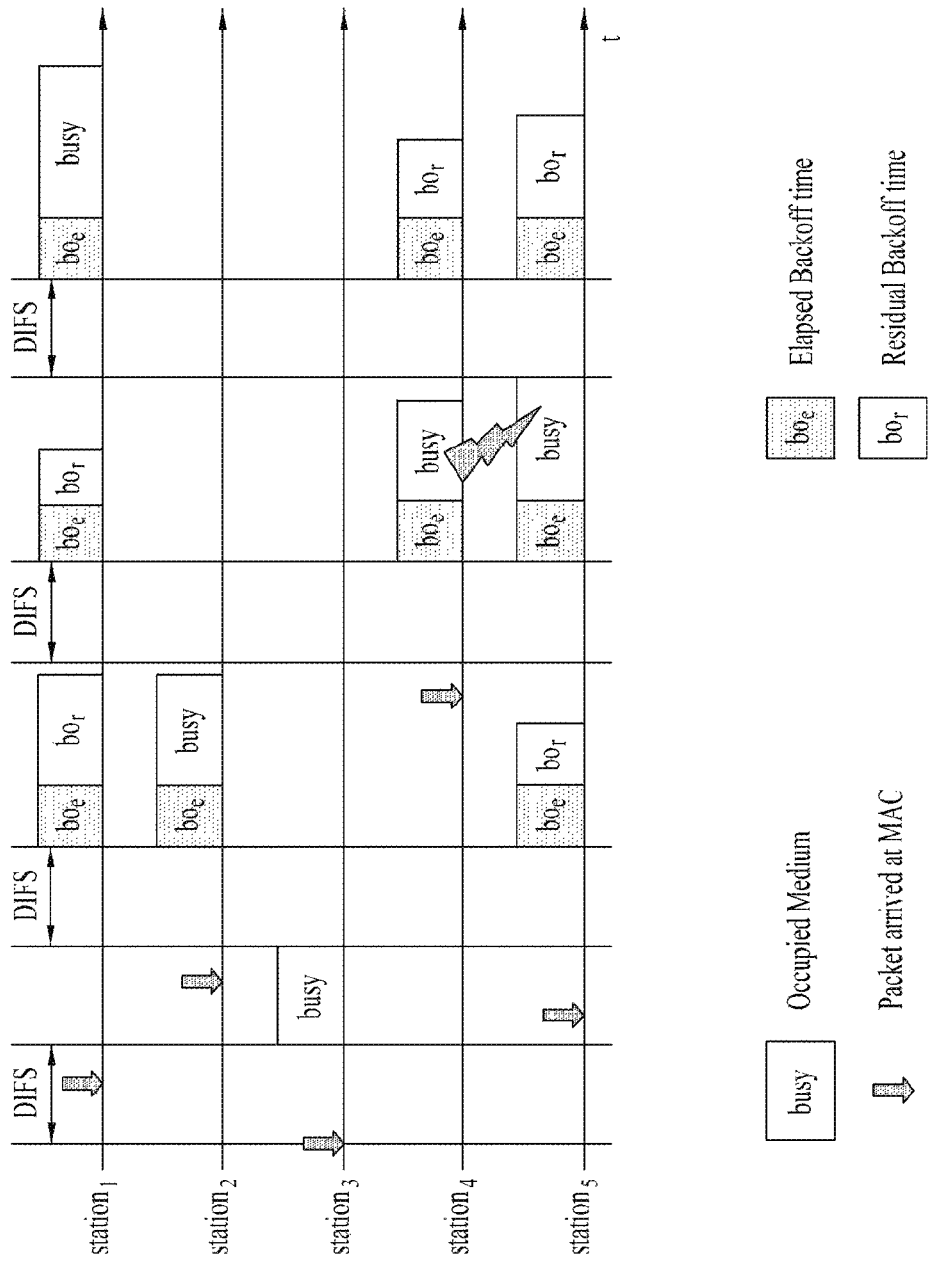
FIG. 4 is a diagram illustrating a backoff process.

FIG. 4 is a diagram illustrating a backoff process.

Operation based on a random backoff period will be described with reference to FIG. 4. If a medium is changed from an occupied or busy state to an idle state, STAs may attempt data (or frame) transmission. At this time, as a method for minimizing collision, the STAs may select respective random backoff counts, wait for slot times corresponding to the random backoff counts and attempt transmission. The random backoff count has a pseudo-random integer and may be set to one of values of 0 to CW. Here, the CW is a contention window parameter value. The CW parameter is set to CWmin as an initial value but may be set to twice CWmin if transmission fails (e.g., ACK for the transmission frame is not received). If the CW parameter value becomes CWmax, data transmission may be attempted while maintaining the CWmax value until data transmission is successful. If data transmission is successful, the CW parameter value is reset to CWmin. CW, CWmin and CWmax values are preferably set to 2n−1 (n=0, 1, 2, . . . ).

If the random backoff process starts, the STA continuously monitors the medium while the backoff slots are counted down according to the set backoff count value. If the medium is in the occupied state, countdown is stopped and, if the medium is in the idle state, countdown is resumed.

In the example of FIG. 4, if packets to be transmitted to the MAC of STA3 arrive, STA3 may confirm that the medium is in the idle state during the DIFS and immediately transmit a frame. Meanwhile, the remaining STAs monitor that the medium is in the busy state and wait. During a wait time, data to be transmitted may be generated in STA1, STA2 and STA5. The STAs may wait for the DIFS if the medium is in the idle state and then count down the backoff slots according to the respectively selected random backoff count values. In the example of FIG. 4, STA2 selects a smallest backoff count value and STA1 selects a largest backoff count value. That is, the residual backoff time of STA5 is less than the residual backoff time of STA1 when STA2 completes backoff count and starts frame transmission. STA1 and STA5 stop countdown and wait while STA2 occupies the medium. If occupancy of the medium by STA2 ends and the medium enters the idle state, STA1 and STA5 wait for the DIFS and then resume countdown. That is, after the residual backoff slots corresponding to the residual backoff time are counted down, frame transmission may be started. Since the residual backoff time of STA5 is less than of STA1, STA5 starts frame transmission. If STA2 occupies the medium, data to be transmitted may be generated in the STA4. At this time, STA4 may wait for the DIFS if the medium enters the idle state, perform countdown according to a random backoff count value selected thereby, and start frame transmission. In the example of FIG. 4, the residual backoff time of STA5 accidentally matches the random backoff time of STA4. In this case, collision may occur between STA4 and STA5. If collision occurs, both STA4 and STA5 do not receive ACK and data transmission fails. In this case, STA4 and STA5 may double the CW value, select the respective random backoff count values and then perform countdown. STA1 may wait while the medium is busy due to transmission of STA4 and STA5, wait for the DIFS if the medium enters the idle state, and start frame transmission if the residual backoff time has elapsed.

Sensing Operation of STA

As described above, the CSMA/CA mechanism includes not only physical carrier sensing for directly sensing a medium by an AP and/or an STA but also virtual carrier sensing. Virtual carrier sensing solves a problem which may occur in medium access, such as a hidden node problem. For virtual carrier sensing, MAC of a wireless LAN may use a network allocation vector (NAV). The NAV refers to a value of a time until a medium becomes available, which is indicated to another AP and/or STA by an AP and/or an STA which are currently utilizing the medium or has rights to utilize the medium. Accordingly, the NAV value corresponds to a period of time when the medium will be used by the AP and/or the STA for transmitting the frame, and medium access of the STA which receives the NAV value is prohibited during that period of time. The NAV may be set according to the value of the "duration" field of a MAC header of a frame.

A robust collision detection mechanism for reducing collision has been introduced, which will be described with reference to FIGS. 5 and 7. Although a transmission range may not be equal to an actual carrier sensing range, for convenience, assume that the transmission range may be equal to the actual carrier sensing range.

Figure 5:
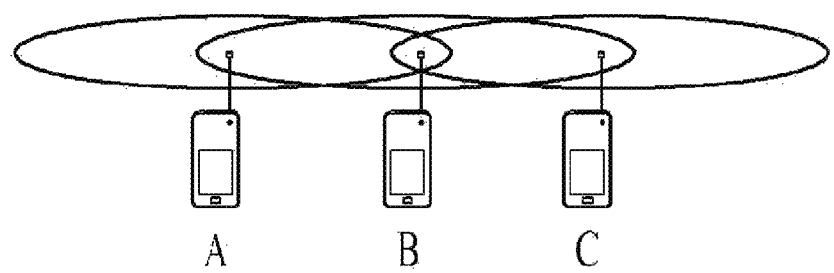
FIG. 5 is a diagram illustrating a hidden node and an exposed node.
Figure 5:
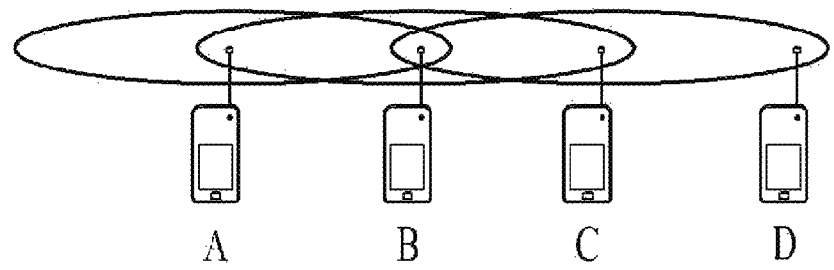

FIG. 5 is a diagram illustrating a hidden node and an exposed node.

FIG. 5(a) shows a hidden node, and, in this case, an STA A and an STA B are performing communication and an STA C has information to be transmitted. More specifically, although the STA A transmits information to the STA B, the STA C may determine that the medium is in the idle state when carrier sensing is performed before transmitting data to the STA B. This is because the STA C may not sense transmission of the STA A (that is, the medium is busy). In this case, since the STA B simultaneously receives information of the STA A and the STA C, collision occurs. At this time, the STA A may be a hidden node of the STA C.

FIG. 5(b) shows an exposed node and, in this case, the STA B transmits data to the STA A and the STA C has information to be transmitted to the STA D. In this case, if the STA C performs carrier sensing, it may be determined that the medium is busy due to transmission of the STA B. Accordingly, if the STA C has information to be transmitted to the STA D, the STA C waits until the medium enters the idle state since it is sensed that the medium is busy. However, since the STA A is actually outside the transmission range of the STA C, transmission from the STA C and transmission from the STA B may not collide from the viewpoint of the STA A. Therefore, the STA C unnecessarily waits until transmission of the STA B is stopped. At this time, the STA C may be an exposed node of the STA B.

Figure 6:
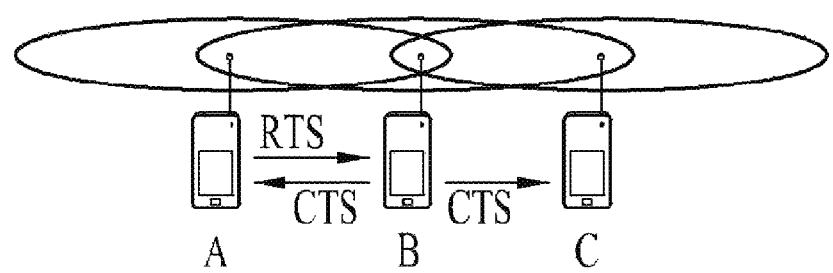
FIG. 6 is a diagram illustrating an RTS and a CTS.
Figure 6:
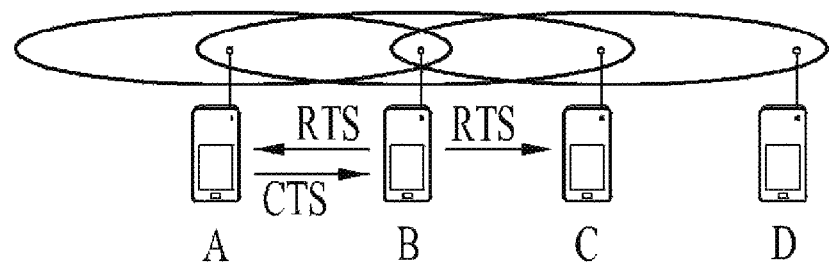

FIG. 6 is a diagram illustrating RTS and CTS.

In the example of FIG. 5, in order to efficiently use a collision avoidance mechanism, short signaling packet such as RTS (request to send) and CTS (clear to send) may be used. RST/CTS between two STAs may be enabled to be overheard by peripheral STAs such that the peripheral STAs confirm information transmission between the two STAs. For example, if a transmission STA transmits an RTS frame to a reception STA, the reception STA transmits a CTS frame to peripheral UEs to inform the peripheral UEs that the reception STA receives data.

FIG. 6(a) shows a method for solving a hidden node problem. Assume that both the STA A and the STA C attempt to transmit data to the STA B. If the STA A transmits the RTS to the STA B, the STA B transmits the CTS to the peripheral STA A and STA C. As a result, the STA C waits until data transmission of the STA A and the STA B is finished, thereby avoiding collision.

FIG. 6(b) shows a method of solving an exposed node problem. The STA C may overhear RTS/CTS transmission between the STA A and the STA B and determine that collision does not occur even when the STA C transmits data to another STA (e.g., the STA D). That is, the STA B transmits the RTS to all peripheral UEs and transmits the CTS only to the STA A having data to be actually transmitted. Since the STA C receives the RTS but does not receive the CTS from the STA A, it can be ascertained that the STA A is outside carrier sensing of the STA C.

Power Management

As described above, in a WLAN system, channel sensing should be performed before an STA performs transmission and reception. When the channel is always sensed, continuous power consumption of the STA is caused. Power consumption in a reception state is not substantially different from power consumption in a transmission state and continuously maintaining the reception state imposes a burden on an STA with limited power (that is, operated by a battery). Accordingly, if a reception standby state is maintained such that the STA continuously senses the channel, power is inefficiently consumed without any special advantage in terms of WLAN throughput. In order to solve such a problem, a power management (PM) mode of the STA is supported in a WLAN system.

The PM mode of STAs is divided into an active mode and a power save (PS) mode. STAs fundamentally operate in an active mode. An STA which operates in the active mode is maintained in an awake state. The awake state refers to a state in which normal operation such as frame transmission and reception or channel scanning is possible. An STA which operates in the PS mode operates while switching between a sleep state or an awake state. An STA which operates in the sleep state operates with minimum power and does not perform frame transmission and reception or channel scanning.

Since power consumption is reduced as the sleep state of the STA is increased, the operation period of the STA is increased. However, since frame transmission and reception are impossible in the sleep state, the STA cannot unconditionally operate in the sleep state. If a frame to be transmitted from the STA operating in the sleep state to an AP is present, the STA may be switched to the awake state to transmit the frame. If a frame to be transmitted from the AP to the STA is present, the STA in the sleep state cannot receive the frame and cannot confirm that the frame to be received is present. Accordingly, the STA may need to perform an operation for switching to the awake state according to a specific period in order to confirm presence of the frame to be transmitted thereto (to receive the frame if the frame to be transmitted is present).

An AP may transmit beacon frames to STAs within a BSS at a predetermined period. The beacon frame may include a traffic indication map (TIM) information element. The TIM information element includes information indicating that buffered traffic for STAs associated with the AP 210 is present and the AP will transmit a frame. The TIM element includes a TIM used to indicate a unicast frame or a delivery traffic indication map (DTIM) used to indicate a multicast or broadcast frame.

Figure 7:
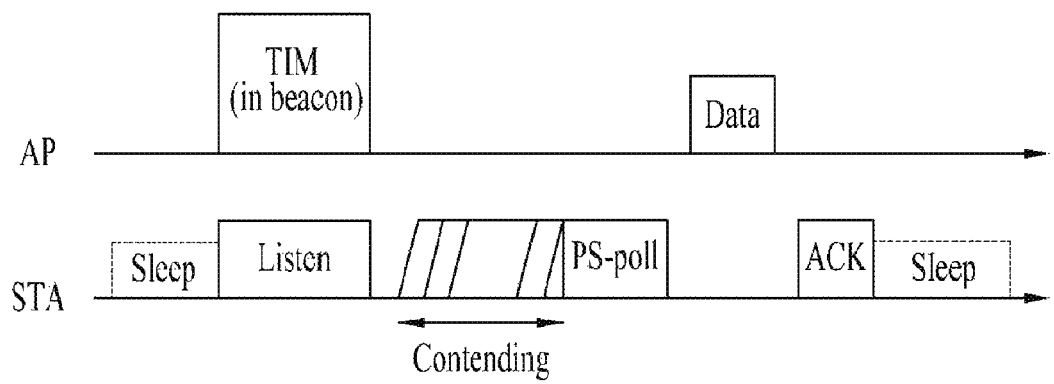
FIGS. 7 to 9 are diagrams illustrating an operation of an STA which receives a TIM.
Figure 8:
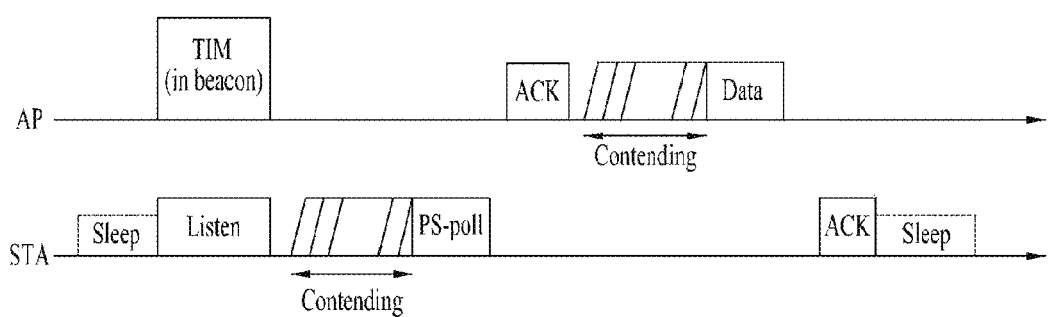
Figure 9:
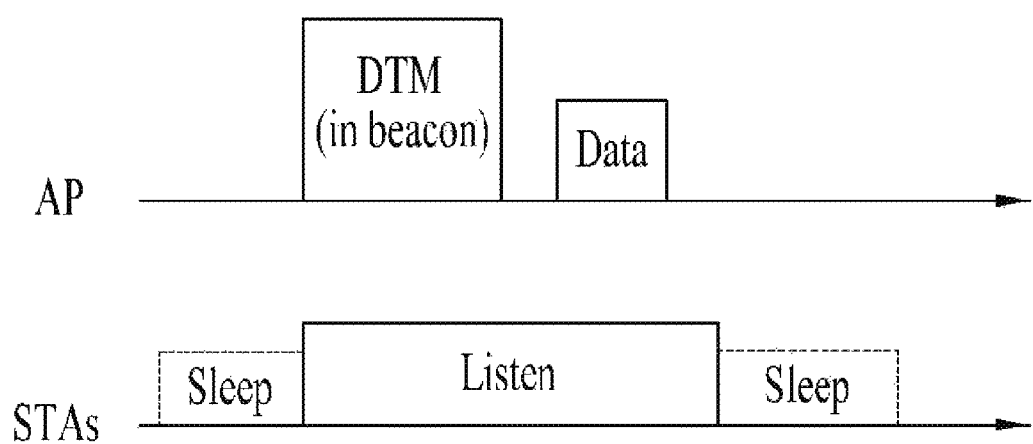

FIGS. 7 to 9 are diagrams illustrating an operation of an STA which receives a TIM in detail.

Referring to FIG. 7, an STA may switch from a sleep state to an awake state in order to receive a beacon frame including a TIM from an AP and interpret the received TIM element to confirm that buffered traffic to be transmitted thereto is present. The STA may contend with other STAs for medium access for transmitting a PS-Poll frame and then transmit the PS-Poll frame in order to request data frame transmission from the AP. The AP which has received the PS-Poll frame transmitted by the STA may transmit the frame to the STA. The STA may receive the data frame and transmit an ACK frame to the AP. Thereafter, the STA may switch to the sleep state.

As shown in FIG. 7, the AP may receive the PS-Poll frame from the STA and then operate according to an immediate response method for transmitting a data frame after a predetermined time (e.g., a short inter-frame space (SIFS)). If the AP does not prepare a data frame to be transmitted to the STA during the SIFS after receiving the PS-Poll frame, the AP may operate according to a deferred response method, which will be described with reference to FIG. 8.

In the example of FIG. 8, the operation of the STA to switch from the sleep state to the awake state, receive a TIM from the AP, perform contending and transmit a PS-Poll frame to the AP is the same as that of FIG. 7. If the data frame is not prepared during the SIFS even when the AP receives the PS-Poll frame, an ACK frame instead of the data frame may be transmitted to the STA. If the data frame is prepared after transmitting the ACK frame, the AP may perform contending and then transmit the data frame to the STA. The STA may transmit an ACK frame indicating that the data frame has been successfully received to the AP and may switch to the sleep state.

FIG. 9 shows an example in which the AP transmits the DTIM. STAs may switch from the sleep state to the awake state in order to receive a beacon frame including the DTIM element from the AP. The STAs may ascertain that a multicast/broadcast frame will be transmitted via the received DTIM. The AP may immediately transmit data (that is, a multicast/broadcast frame) without PS-Poll frame transmission and reception after transmitting the beacon frame including the DTIM. The STAs may receive data in the awake state after receiving the beacon frame including the DTIM and may switch to the sleep state after completing data reception.

General Frame Structure

Figure 10:
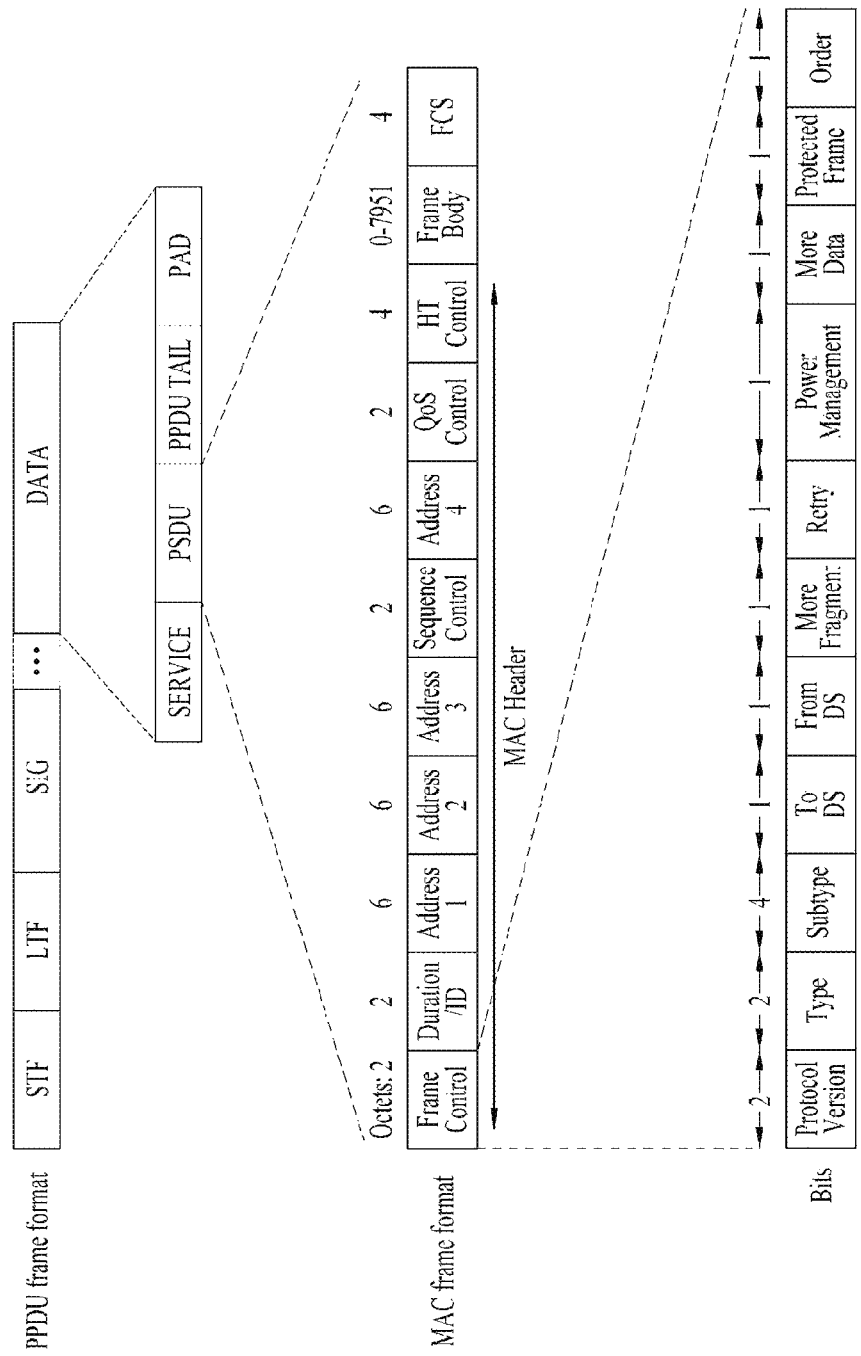
FIG. 10 is a diagram illustrating an example of a frame structure used in an IEEE 802.11 system.

FIG. 10 is a diagram illustrating an example of a frame structure used in IEEE 802.11.

A physical layer protocol data unit (PPDU) frame format may include a short training field (STF), a long training field (LTF), a signal (SIG) field and a data field. The most basic (e.g., non-HT (High Throughput)) PPDU frame format may include only legacy-STF (L-STF), legacy-LTF (L-LTF), the SIG field and the data field.

The STF is a signal for signal detection, automatic gain control (AGC), diversity selection, accurate synchronization, and the like and the LTF is a signal for channel estimation, frequency error estimation, and the like. The STF and the LTF may be collectively referred to as a PLCP preamble, and the PLCP preamble may be a signal for synchronization of an OFDM physical layer and channel estimation.

The SIG field may include a RATE field and a LENGTH field. The RATE field may include information about data modulation and coding rate. The LENGTH field may include information about a data length. Additionally, the SIG field may include a parity bit, a SIG TAIL bit, and the like.

The data field may include a SERVICE field, a physical layer service data unit (PSDU), a PPDU TAIL bit and also include padding bits as necessary. Some bits of the SERVICE field may be used for synchronization of a descrambler at a receiving end. The PSDU corresponds to a MAC protocol data unit (MPDU) defined in the MAC layer and may include data generated/used by a higher layer. The PPDU TAIL bit can be used to return an encoder to 0 state. The padding bits can be used to adjust a data field length to a predetermined unit.

The MPDU is defined in various MAC frame formats and a basic MAC frame includes a MAC header, a frame body and a frame check sequence (FCS). The MAC frame includes a MPDU and may be transmitted/received through a PSDU of a PPDU frame format.

The MAC header includes a frame control field, a duration/ID field, and an address field. The frame control field may include control information necessary for frame transmission/reception. The duration/ID field may be set to a time for transmitting a corresponding frame.

The duration/ID field included in the MAC header may be set to a 16-bit length (e.g., B0 to B15). Content included in the duration/ID field may depend on a frame type and a sub-type, whether transmission is performed during a contention free period (CFP), QoS capability of a transmission STA, and the like. (i) In control frames having a sub-type of PS-Poll, the duration/ID field may include the AID of a transmission STA (e.g., through 14 LSBs) and 2 MSBs may be set to 1. (ii) In frames transmitted by a point coordinator (PC) or a non-QoS STA for the CFP, the duration/ID field may be set to a fixed value (e.g., 32768). (iii) In other frames transmitted by a non-QoS STA or control frames transmitted by a QoS STA, the duration/ID field may include a duration value defined per frame type. In a data frame or a management frame transmitted by a QoS STA, the duration/ID field may include a duration value defined for each frame type.

For example, if B15 of the duration/ID field is set to B15=0, it indicates that the duration/ID field is used to indicate a TXOP duration, and B0 to B14 may be used to indicate an actual TXOP duration. The actual TXOP duration indicated by B0 to B14 may be any one of 0 to 32767 and the unit thereof may be microsecond (μs). However, when the duration/ID field indicates a fixed TXOP duration value (e.g., 32768), B15=1 and B0 to B14=0. If B14=1 and B15=1, the duration/ID field is used to indicate an AID and B0 to B13 indicate one AID of 1 to 2007. Refer to IEEE 802.11 standard document for details of the sequence control, QoS control, HT control subfields of the MAC header.

The frame control field of the MAC header may include Protocol Version, Type, Subtype, To DS, From DS, More Fragment, Retry, Power Management, More Data, Protected Frame and Order subfields. Refer to IEEE 802.11 standard document for details of the subfields of the frame control field.

WUR (Wake-Up Radio)

First, a wake-up radio receiver (WURx) compatible with a WLAN system (e.g., 802.11) will be described with reference to FIG. 11.

Figure 11:
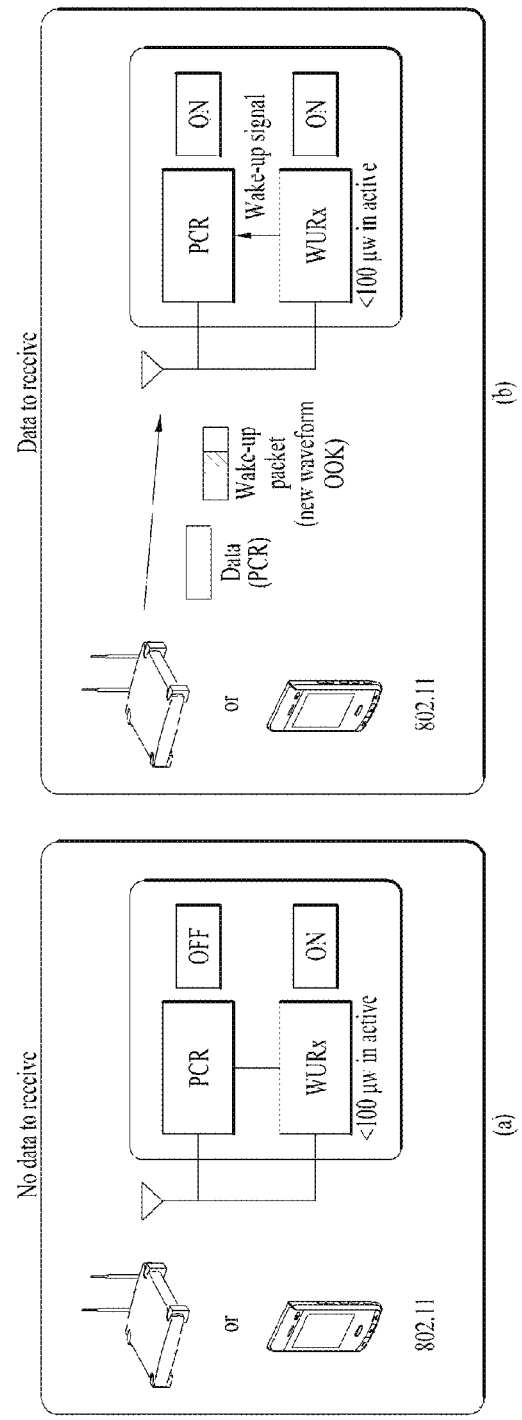
FIG. 11 is a diagram illustrating a WUR receiver that can be used in a wireless LAN system (e.g., 802.11).

Referring to FIG. 11, an STA may support primary connectivity radio (PCR) (e.g., IEEE 802.11a/b/g/n/ac/ax WLAN) and wake-up radio (WUR) (e.g., IEEE 802.11ba) for main wireless communication.

The PCR is used for data transmission and reception and may be turned off if there is no data to be transmitted/received. When the PCR is turned off, the WURx of the STA may wake up the PCR if there is a packet to be received. Accordingly, user data is transmitted and received through the PCR.

The WURx is not used for user data and may serve to wake a PCR transceiver up. The WURx may be a simple receiver that does not have a transmitter and is enabled while the PCR is turned off. It is desirable that target power consumption of the WURx do not exceed 100 microwatt (μW) in an enabled state. For such low-power operation, a simple modulation method, for example, on-off keying (OOK) may be used and a narrow bandwidth (e.g., 4 MHz or 5 MHz) may be used. A target reception range (e.g., distance) of the WURx may correspond to 802.11.

Figure 12:
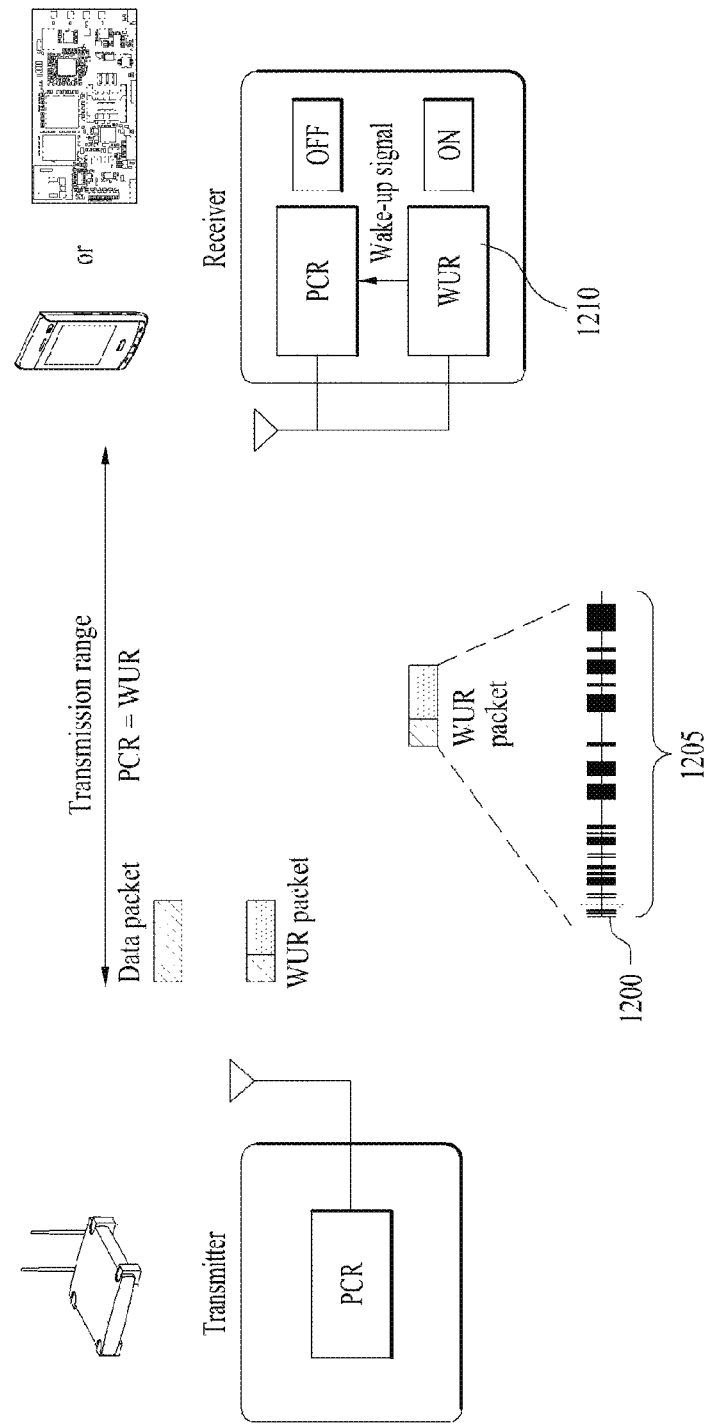
FIG. 12 is a diagram illustrating a WUR receiver operation.

FIG. 12 is a diagram illustrating a design and operation of a WUR packet.

Referring to FIG. 12, the WUR packet may include a PCR part 1200 and a WUR part 1205.

The PCR part 1200 is for coexistence with legacy WLAN systems and may also be referred to as a WLAN preamble. In order to protect the WUR packet from other PCR STAs, at least one of L-STF, L-LTF and L-SIG of a legacy WLAN may be included in the PCR part 1200. Accordingly, a 3rd party legacy STA can ascertain that the WUR packet is not intended therefor and a PCR medium has been occupied by another STA through the PCR part 12000 of the WUR packet. However, WURx does not decode the PCR part of the WUR packet because WURx which supports narrow bands and OOK demodulation does not support PCR signal reception.

At least a part of the WUR part 1205 may be a part modulated according to OOK. For example, the WUR part may include at least one of a WUR preamble, a MAC header (e.g., receiver address or the like), a frame body and a frame check sequence (FCS). OOK modulation may be performed by modifying an OFDM transmitter.

A WURx 1210 consumes very low power of 100 W or less, as described above, and may be implemented as a small and simple OOK demodulator.

Since the WUR packet needs to be designed to be compatible in WLAN systems as described above, the WUR packet may include the preamble (e.g., OFDM) of the legacy WLAN and new LP-WUR signal waveforms (e.g., OOK).

Figure 13:
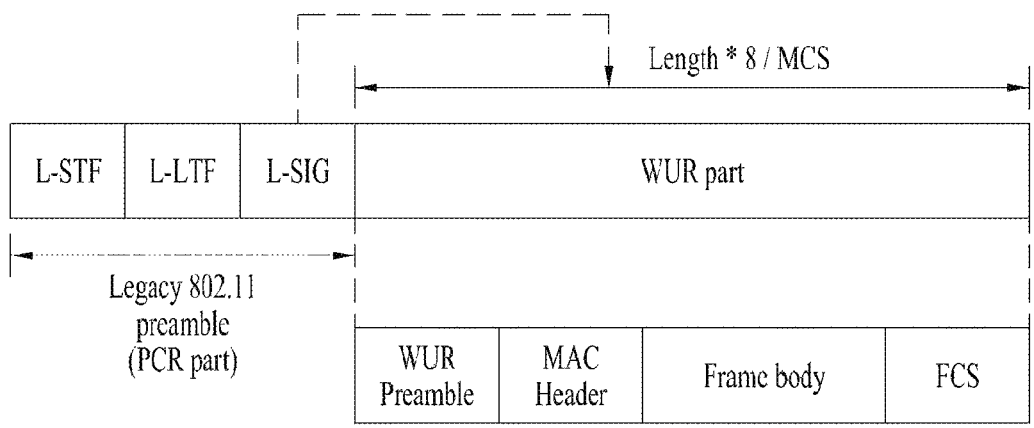
FIG. 13 illustrates an exemplary WUR packet.

FIG. 13 illustrates an exemplary WUR packet. The WUR packet of FIG. 13 includes a PCR part (e.g., legacy WLAN preamble) for coexistence with legacy STAs.

Referring to FIG. 13, the legacy WLAN preamble may include L-STF, L-LTF and L-SIG. In addition, a WLAN STA (e.g., 3rd party STA) may ascertain the end of the WUR packet through L-SIG. For example, the L-SIG field may indicate the length of a payload (OOK-modulated, for example) of the WUR packet.

A WUR part may include at least one of a WUR preamble, a MAC header, a frame body and an FCS. The WUR preamble may include a PN sequence, for example. The MAC header may include a receiver address. The frame body may include information necessary for wake-up. The FCS may include a cyclic redundancy check (CRC).

Figure 14:
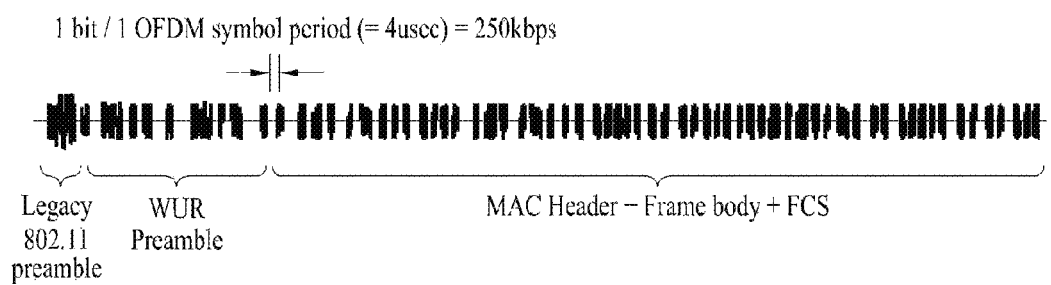
FIG. 14 illustrates waveforms of a WUR packet.

FIG. 14 illustrates waveforms of the WUR packet of FIG. 13. Referring to FIG. 14, 1 bit per OFDM symbol length (e.g., 4 μsec) may be transmitted in an OOK-modulated WUR part. Accordingly, the data rate of the WUR part may be 250 kbps.

Figure 15:
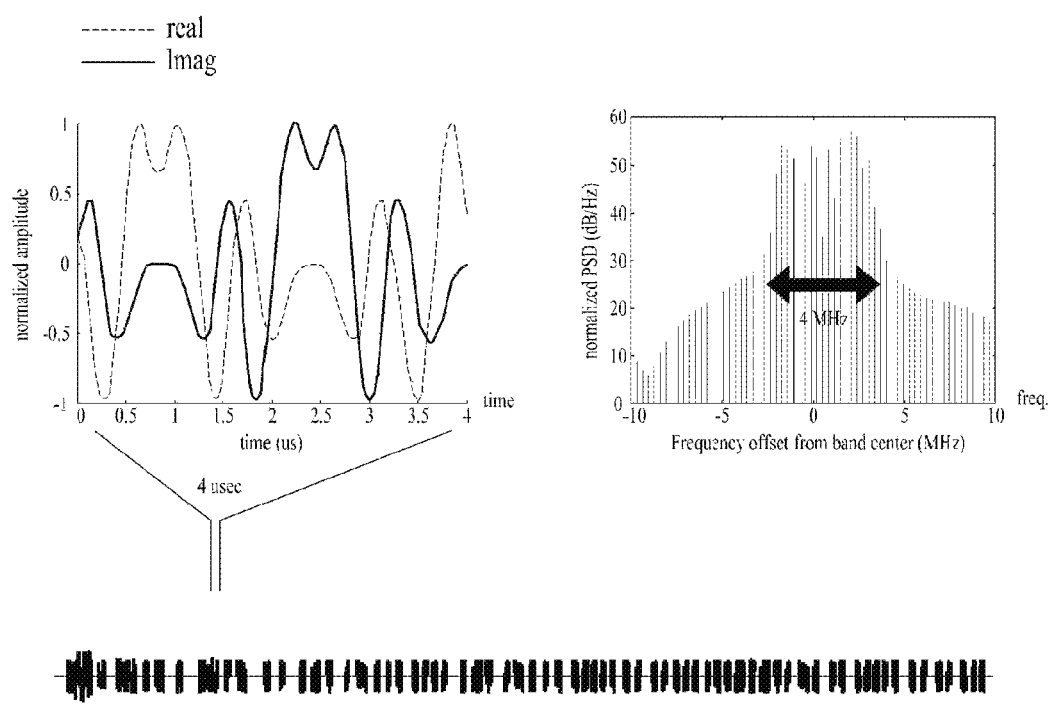
FIG. 15 is a diagram illustrating a WUR packet generated using an OFDM transmitter of a wireless LAN.

FIG. 15 is a diagram illustrating generation of a WUR packet using an OFDM transmitter of a WLAN. While the phase shift keying (PSK)-OFDM transmission technique is used in the WLAN, generation of a WUR packet through an additional OOK modulator for modulation causes increase in transmitter implementation costs. Accordingly, a method for generating an OOK-modulated WUR packet by reusing an OFDM transmitter is described.

According to OOK modulation, a bit value 1 is modulated into a symbol (i.e., on) having arbitrary power loaded therein or power equal to or greater than a threshold value and a bit value 0 is modulated into a symbol (i.e., off) having no power loaded therein or power less than the threshold value. The bit value 1 may be defined as power off.

In such an OOK modulation method, the bit value 1/0 is indicated through power on/off at the corresponding symbol position. These simple OOK modulation/demodulation methods have the advantage of reducing power consumed for signal detection/demodulation of a receiver and costs for realizing the same. Further, OOK modulation of turning on/off a signal may be performed by reusing a legacy OFDM transmitter.

The left graph of FIG. 15 shows the real part and the imaginary part of a normalized amplitude for 1 symbol period (e.g., 4 μsec) with respect to a bit value 1 which is OOK-modulated by reusing an OFDM transmitter of a legacy WLAN. An OOK modulation result for a bit value 0 corresponds to power off and thus illustration thereof is omitted.

The right graph of FIG. 15 shows normalized power spectral density (PSD) on the frequency domain with respect to a bit value 1 which is OOK-modulated by reusing an OFDM transmitter of the legacy WLAN. For example, the center frequency 4 MHz in the corresponding band may be used for WUR. Although it is assumed that WUR operates with a bandwidth of 4 MHz in FIG. 15, it is for the purpose of convenience of description and other frequency bandwidths may be used. However, it is desirable that WUR operate with a narrower bandwidth than the operation bandwidth of PCR (e.g., legacy WLAN) for power saving.

In FIG. 15, it is assumed that a subcarrier spacing is 312.5 kHz and an OOK pulse bandwidth corresponds to 13 subcarriers. The 13 subcarriers correspond to approximately 4 MHz (i.e., 4.06 MHz=13*312.5 kHz) as described above.

When an input sequence of inverse fast Fourier transform (IFFT) is defined as s={13 subcarrier tone sequence} in a legacy OFDM transmitter, IFFT for the sequence s is performed such that $X_f$=IFFT(s), and then a cyclic prefix (CP) having a length of 0.8 µsec is attached thereto, a symbol length of approximately 4 µs is obtained.

The WUR packet may also be referred to as a WUR signal, a WUR frame or a WUR PPDU. The WUR packet may be a packet (e.g., WUR beacon) for broadcast/multicast or a packet (e.g., packet for ending a WUR mode of a specific WUR STA and waking up the specific WUR STA) for unicast.

Figure 16:
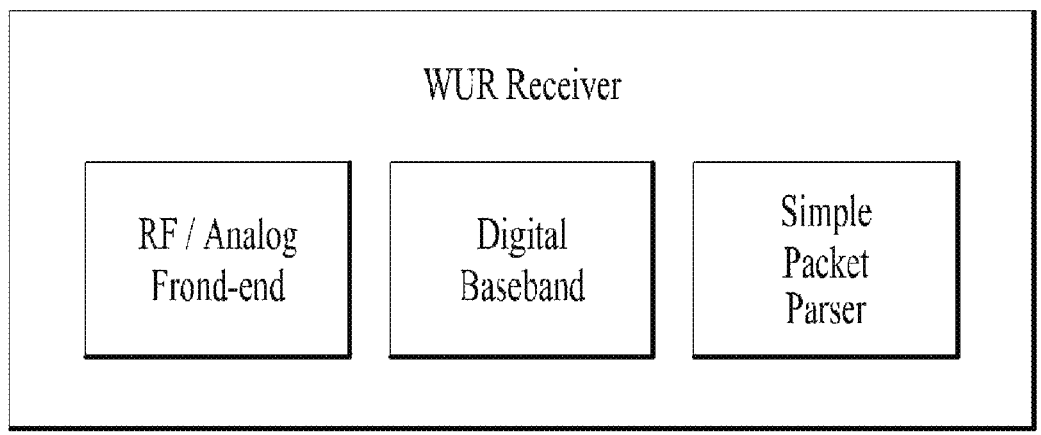
FIG. 16 illustrates a structure of a WUR receiver.

FIG. 16 illustrates a structure of a WUR receiver (WURx). Referring to FIG. 16, the WURx may include an RF/analog front-end, a digital baseband processor and a simple packet parser. FIG. 16 illustrates an exemplary configuration and the WUR receiver of the present disclosure is not limited to FIG. 16.

Hereinafter, a WLAN STA having the WUR receiver is simply referred to as a WUR STA. The WUR STA may also be simply referred to as an STA.

OOK modulation based on Manchester coding may be used for a WUR payload. The WUR payload may support multiple data rates (e.g., 62.5 kbps and 250 kbps). A data rate applied to the WUR payload may be indicated by a WUR preamble.

In order for a WUR STA to enter a WUR mode, WUR mode signaling may be defined. For example, when explicit WUR mode signaling is used, WUR mode signaling may be performed through PCR and WUR operation parameters may be provided through WUR mode signaling.

A WUR action frame for WUR negotiation may be defined and the WUR action frame may be transmitted through PCR.

An AP may use EDCA for WUR frame transmission. For example, the AP may transmit a WUR signal by reusing the existing 4-access category (AC) and corresponding EDCA parameters. The WUR signal may be a unicast wake-up packet, a multicast wake-up packet, a broadcast wake-up packet or a WUR beacon, for example, and the present disclosure is not limited thereto. The AP can use any AC for transmission of a WUR beacon or a multicast wake-up packet. Unless the AP has a buffered frame for an STA, the AP can use any AC for a unicast wake-up packet. After the AP transmits a WUR signal using EDCAF of a specific AC, the AP should not update reattempt counts of CW and AC. The AP should not update reattempt counts of CW and AC when failure of a unicast wake-up packet transmitted using EDCACF of a specific AC is confirmed.

The AP waits for a timeout interval after transmission of a unicast wake-up packet. If the AP receives any transmission of an STA for the timeout interval, it can be regarded as successful wake-up packet transmission. On the other hand, when wake-up packet transmission fails, the AP retransmits the wake-up packet. The STA transmits a response frame to the AP through PCR after reception of the unicast wake-up packet.

To wake up multiple WUR mode STAs, a multi-user wake-up frame may be transmitted in a multicast/broadcast manner. The AP may transmit a broadcast wake-up frame and then transmit a broadcast/multicast frame through PCR after a preparation period.

A WUR beacon frame may be periodically transmitted and a beacon interval may be indicated in a WUR mode element. The WUR mode element may be transmitted through PCR. The WUR beacon frame may include a timing synchronization function (TSF) for synchronization.

The AP may transmit a wake-up packet to STAs and then transmit a 11ax trigger frame for requesting response frames from the STAs.

Figure 17:
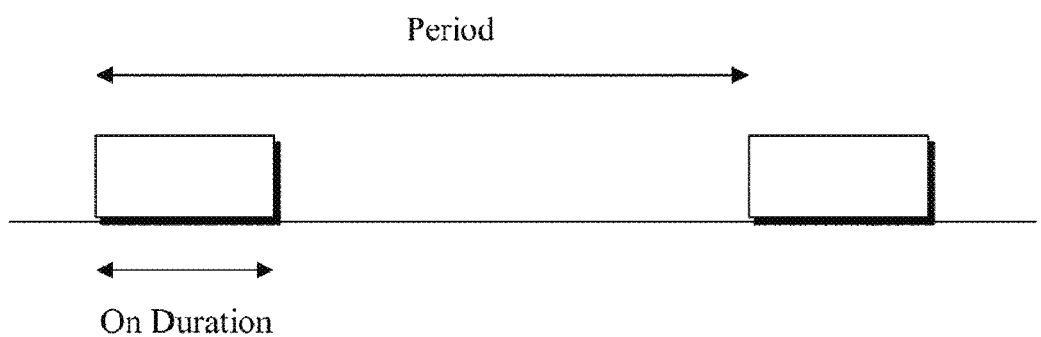
FIG. 17 is a diagram illustrating a WUR duty cycle mode.

FIG. 17 is a diagram illustrating a WUR duty cycle mode. A WUR receiver of an STA may operate in a duty cycle mode. A WUR duty cycle period may be a multiple of a basic unit and the basic unit may be indicated by the AP. An on duration is set to be equal to or greater than a minimum wake-up duration in each WUR duty cycle period. The minimum wake-up duration may be indicated by the AP. The AP may determine a WUR duty cycle start point.

Figure 18:
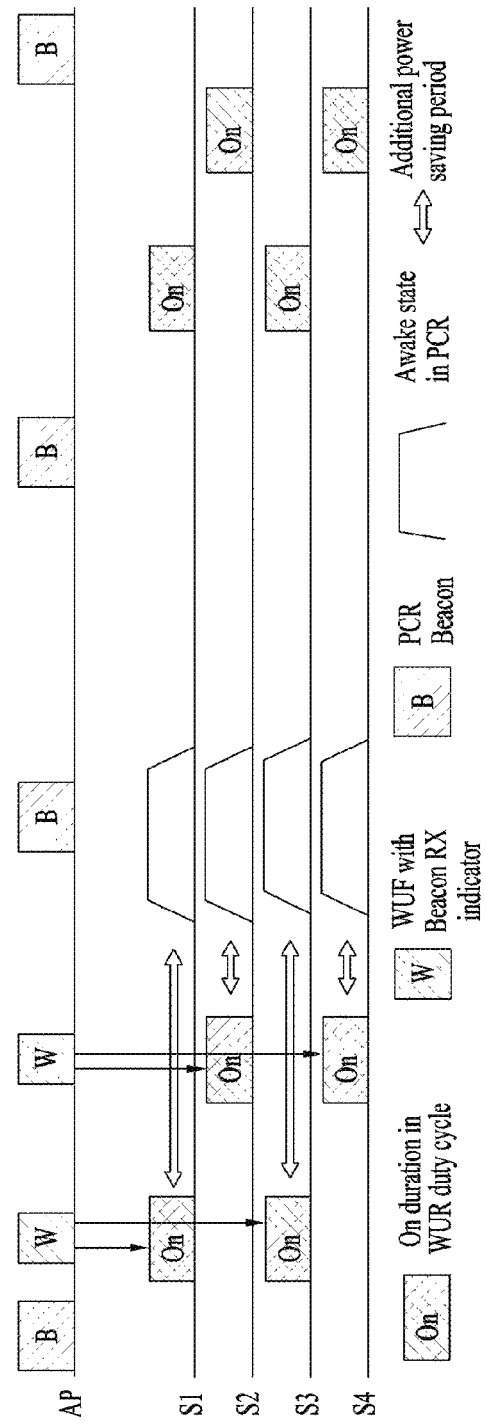
FIG. 18 is a diagram illustrating a method of updating PCR system parameters by WUR STAs according to an embodiment of the present disclosure.

FIG. 18 is a diagram illustrating a method in which WUR STAs operating in the WUR duty cycle mode wake up and update PCR system parameters according to an embodiment of the present disclosure.

An AP may transmit a broadcast wake-up frame (WUF) (e.g., WUR frame) such that WUR STAs operating in the WUR duty cycle mode receive a PCR beacon for system parameter update.

For example, the AP may include information indicating PCR beacon reception in a broadcast WUF and transmit the broadcast WUF in an on duration of the WUR duty cycle mode. When an STA receives the broadcast WUF including the information indicating PCR beacon reception in an on duration, the STA wakes up at a PCR beacon transmission timing instead of immediately waking up and thus can reduce unnecessary standby power consumption. After the STA updates system parameters by receiving a PCR beacon, the STA can immediately enter a WUR mode without additionally signaling retuning to the WUR mode to the AP.

Figure 19:
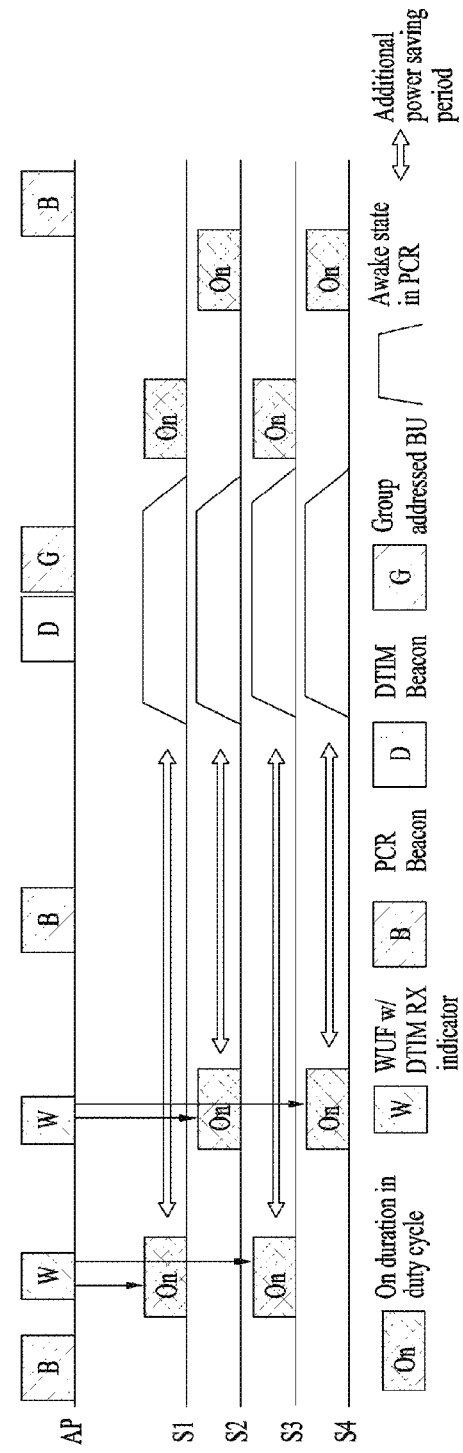
FIG. 19 is a diagram illustrating a method of receiving, by WUR STAs, a group addressed BU on PCR according to an embodiment of the present disclosure.

FIG. 19 is a diagram illustrating a method in which WUR STAs operating in the WUR duty cycle mode wake up and receive a group addressed BU on PCR according to an embodiment of the present disclosure.

Information about reception of a group addressed BU (e.g., broadcast/multicast data) on PCR is indicated through a DTIM beacon. Accordingly, WUR STAs need to receive a DTIM beacon first before reception of the group addressed BU.

An AP may transmit a broadcast WUF (e.g., WUR frame) such that WUR STAs operating in the WUR duty cycle mode receive the DTIM beacon for reception of the group addressed BU.

For example, the AP includes information indicating reception of the DTIM beacon (for group addressed BU reception) in a broadcast WUF and transmits the broadcast WUF in an on duration of the WUR duty cycle mode. When an STA has received the broadcast WUF including the information indicating reception of the DTIM beacon, the STA wakes up at a DTIM beacon transmission timing on PCR instead of immediately waking up and thus can reduce unnecessary standby power consumption on PCR. After the STA receives the DTIM beacon and then receives the group addressed BU, the STA can immediately enter the WUR mode without additionally signaling retuning to the WUR mode to the AP.

Co-Existence with Legacy Power Saving Mode in WUR Duty Cycle Mode

As a method for transmitting a wake-up packet to STAs in the wake-up radio (WUR) mode in a low power WLAN system (e.g., 802.11 WUR), particularly, a method for co-existence with a power saving (PS) mode of conventional PCR when a wake-up packet is transmitted to STAs in the WUR duty cycle mode will be described.

Specifically, a method for signaling, by an AP, information about DL unicast data generation to STAs when DL unicast data to be transmitted to the STAs is generated after the AP transmits a frame (e.g., broadcast WUF) in order to wake up the STAs for PCR beacon reception or DTIM reception, as described in FIG. 18/19, is proposed.

For example, the AP which has received unicast data for STAs in the WUR mode before transmission of a PCR beacon or a DTIM after transmission of a broadcast(/multicast) WUF may set a bit for a corresponding STA in a partial virtual bitmap of a TIM element and transmit a PCR beacon when the PCR beacon is transmitted (e.g., TIM/DTIM beacon).

An STA which has correctly received the broadcast WUF and the PCR beacon checks the partial virtual bitmap information of the TIM element included in the PCR beacon and transmits PS-poll to the AP when the bit corresponding thereto is set to 1. The STA may receive unicast data from the AP as a response to the PS-poll.

If the bit corresponding to the STA is not set to 1 in the partial virtual bitmap of the TIM element included in the PCR beacon, the STA may receive the PCR beacon, update system parameters as necessary and then immediately enter the WUR mode.

If the bit corresponding to the STA is not set to 1 in the partial virtual bitmap when the broadcast WUF has been transmitted for DTIM/group addressed BU reception of the STA, the STA may receive the DTIM and group addressed BU and immediately enter the WUR mode.

Figure 20:
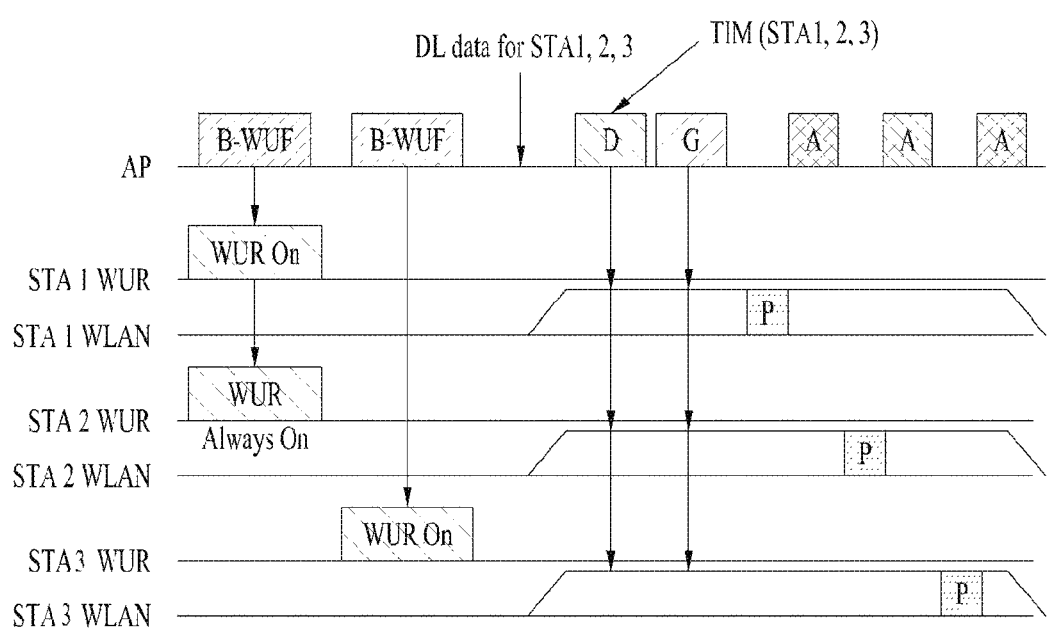
FIG. 20 is a diagram illustrating a unicast data signaling method according to an embodiment of the present disclosure.

FIG. 20 is a diagram illustrating a unicast data signaling method according to an embodiment of the present disclosure.

Referring to FIG. 20, an AP may transmit a broadcast WUF (B-WUF) to WUR mode STAs 1, 2 and 3. The AP which has acquired unicast data to be transmitted to STAs 1, 2 and 3 before transmission of a TIM/DTIM beacon includes information about STAs 1, 2 and 3 in a TIM of a PCR beacon frame and transmits the PCR beacon frame. When STAs 1, 2 and 3 receive the PCR beacon, STAs 1, 2 and 3 may check that TIM information indicate them and thus transmit a PS-poll frame to the AP.

A case in which the AP receives unicast data with respect to STAs which have not received a broadcast WUF although the AP has transmitted the broadcast WUF before beacon/DTIM transmission is assumed. Since the corresponding STAs remain in the WUR mode before beacon/DTIM transmission, the AP may transmit a unicast/multi-user WUF through WUR.

For example, an on duration of the duty cycle mode may be independently set for WUR mode STAs. If a specific WUR mode STA operates in the duty cycle mode and a broadcast WUF transmission timing does not belong to an on duration of the specific WUR mode STA, the specific WUR mode STA cannot receive the broadcast WUF. The AP can ascertain which STA has not received the broadcast WUF because the AP is aware of on duration information of STAs in the duty cycle mode. Accordingly, the AP may transmit a unicast/multi-user WUF to an STA which has not received the broadcast WUF when the AP acquires DL data to be transmitted to the STA through PCR.

Alternatively, when a WUR mode STA in the WUR mode switches to an active mode or a PS mode by turning on WLAN (e.g., PCR), the STA may maintain WUR until the STA transmits a successful PCR frame to the AP through PCR. When WUR is maintained, for example, the STA may operate a WUR receiver in an awake state in a WUR on duration and the WUR receiver may be always in on state if WUR off duration is 0 (i.e., if a WUR on duration value is equal to a duty cycle period value). When the STA successfully transmits a frame to the AP through PCR, the STA can turn off the WUR receiver. As an exemplary method for determining whether frame transmission to the AP through PCR has been successfully performed, when a response frame (e.g., ACK) for a PCR frame transmitted from the STA is received from the AP, it can be determined that frame transmission has been successfully performed.

For example, the STA which turns on PCR upon reception of the broadcast WUF continuously maintains the WUR mode for a specific period (e.g., until PCR frame transmission is successfully performed or for a period negotiated with the AP in advance through PCR). In this case, the AP may transmit a unicast WUF (or multi-user WUF) through WUR upon reception of DL data to be transmitted to STAs from a network, and the STA which continuously maintains the WUR mode may correctly receive the unicast WUF through WUR.

Figure 21:
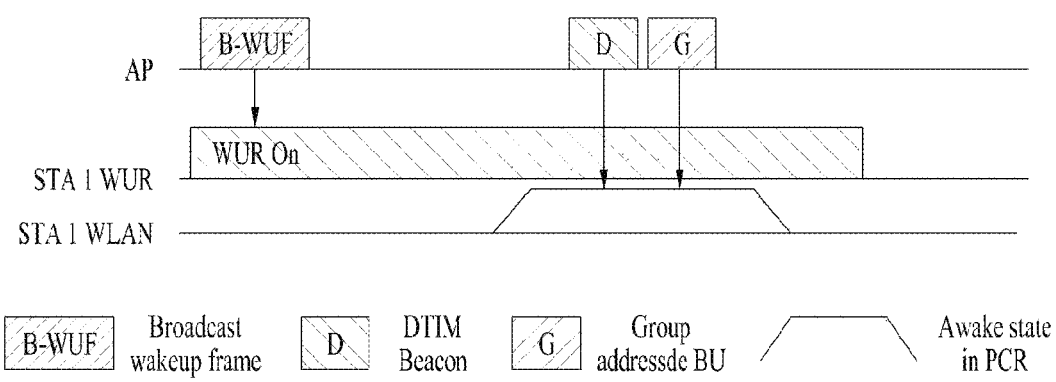
FIG. 21 is a diagram illustrating an exemplary method for maintaining a WUR mode by an STA that has turned on PCR after reception of a B-WUF according to an embodiment of the present disclosure.

FIG. 21 is a diagram illustrating an exemplary method in which an STA which turns on PCR after reception of a B-WUF maintains the WUR mode according to an embodiment of the present disclosure.

Referring to FIG. 21, STA1 turns on PCR upon reception of a B-WUF and receives a PCR beacon and a group addressed BU. Since STA1 does not attempt frame transmission to an AP, the AP cannot confirm that STA1 is in a PCR on state. Accordingly, STA1 which has not transmitted a frame related to PCR on maintains the 'WUR on' state with respect to the AP.

Figure 22:
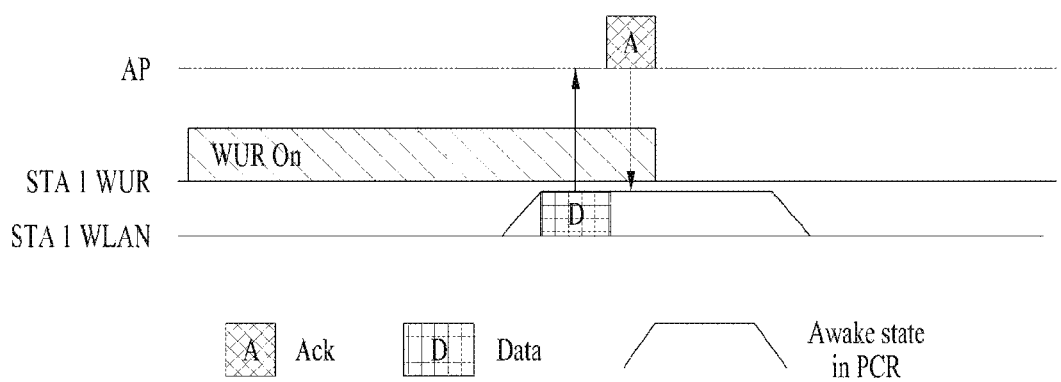
FIG. 22 is a diagram illustrating an exemplary method for maintaining a WUR mode by an STA that has turned on PCR for UL frame transmission according to an embodiment of the present disclosure.

FIG. 22 is a diagram illustrating an exemplary method in which an STA which turns on PCR for UL frame transmission maintains the WUR mode according to an embodiment of the present disclosure.

Referring to FIG. 22, to transmit a UL frame, a WUR STA turns on PCR (enters an awake state) and performs 'contention-based UL frame transmission' to an AP through PCR. The WUR STA may maintain a 'WUR on' state until first UL frame transmission is successfully performed and turn off WUR when the first UL frame transmission is successfully performed.

Additionally, the 'WUR on' state may not be maintained for unicast WUF reception as an exception for the STA operation of maintaining the 'WUR on' state during the 'PCR on' state. That is, a WUR STA which has received a unicast WUF may turn on PCR and turn off WUR.

Figure 23:
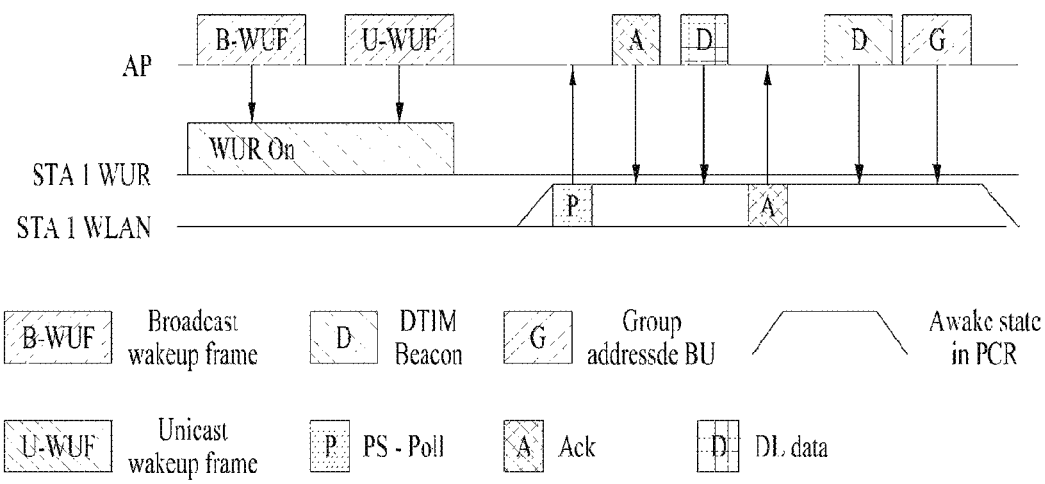
FIG. 23 illustrates an example of operation of an STA which has received B-WUF and unicast-WUF (U-WUF) according to an embodiment of the present disclosure.

FIG. 23 illustrates an example of operation of an STA which has received a B-WUF and a U-WUF (unicast-WUF) according to an embodiment of the present disclosure.

Referring to FIG. 23, a WUR STA may receive a B-WUF through WUR to turn on PCR and attempt to receive a PCR beacon or a group addressed BU (e.g., broadcast/multicast data). During this process, the STA maintains WUR.

Upon reception of a unicast WUF before PCR beacon or group addressed BU reception, the STA transmits a response frame through PCR. Although it is assumed that the response frame transmitted by the STA is a PS-poll frame in the case of FIG. 23, the present disclosure is not limited thereto and other frames such as a QoS null frame may be used as the response frame. The STA may turn off WUR upon reception of the unicast WUF.

In this manner, the STA which has received the broadcast WUF may maintain WUR and then turn off WUR (e.g., WUR doze state) after a PCR frame has been successfully transmitted to the AP (e.g., ACK for PCR frame transmission has been received) or when a unicast WUF has been selectively received. Alternatively, the STA which has received the broadcast WUF may maintain WUR and then turn off WUR after a specific period (e.g., a period negotiated with the AP in advance).

If the AP has unicast data to be transmitted to the STA after transmission of the broadcast WUF, the AP may perform at least one of the following operations (1) to (3)

(1) The AP may set a bit for the corresponding STA in the bitmap of the TIM element to 1 and transmit the TIM element when it transmits a TIM beacon through PCR. The STA can ascertain that the AP has data to be transmitted thereto by checking the TIM.

(2) The AP may transmit a unicast WUF through WUR. An STA which has not received a broadcast WUF or an STA which has not turned on PCR although it has received the broadcast WUF can turn on PCR to receive a PCR frame by receiving the unicast WUF.

(3) The AP may trigger PCR frame transmission to the corresponding STA by transmitting a PCR frame (e.g., trigger frame) for polling the STA. Upon reception of the trigger frame through PCR, the STA may notify the AP that the STA can receive a PCR frame by transmitting a UL response frame through PCR. If the AP does not acquire the UL response frame from the STA, the AP may transmit a unicast WUF to the STA through WUR.

Meanwhile, in the above description, a 'WUR on' (state) may refer to a WURx awake state in which power is supplied to a WURx such that a WUR frame can be received and WUR off may refer to a WURx doze state in which a WUR frame cannot be received. Accordingly, the WURx operates in the WURx awake state in an on duration of the WUR duty cycle mode. Similarly, a PCR component (e.g., a WLAN transceiver supporting 11n/ac/ax) of an STA may also operate in the awake state/doze state. Further, the PCR component may operate in an active mode/PS mode according to an STA power management mode.

Although an STA receives a broadcast wake-up frame, transmits a UL PCR frame, and when a response frame is received from an AP, ends WUR monitoring (i.e., switches to the doze state) in the above description, the present disclosure is not limited to the broadcast wake-up frame. For example, an STA which has received a unicast wake-up frame may transmit a UL frame through PCR and then end WUR monitoring when a response frame is received from the AP.

Figure 24:
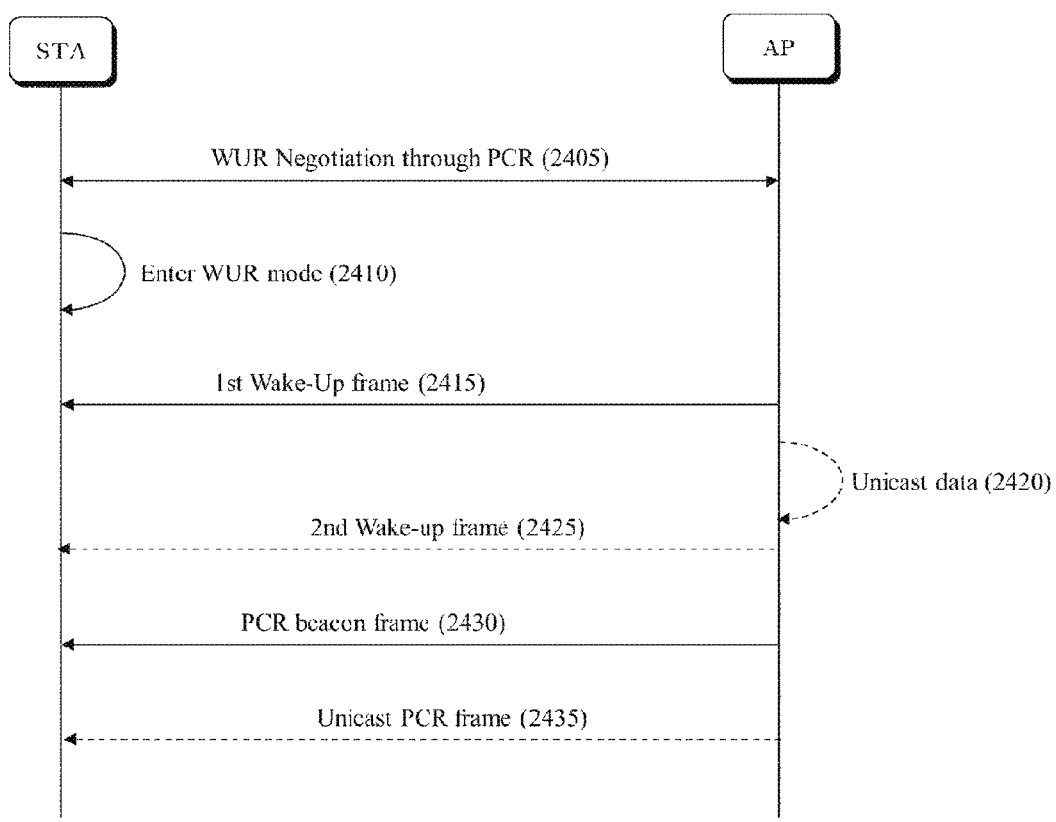
FIG. 24 illustrates a flow of a frame transmission/reception method according to an embodiment of the present disclosure.

FIG. 24 illustrates a flow of a method for transmitting/receiving frames according to an embodiment of the present disclosure. FIG. 24 illustrates exemplary implementation of the above-described embodiments, and the present disclosure is not limited to FIG. 24 and parts the same as those in the above description may be omitted.

An STA may negotiate with an AP for WUR before entering a WUR mode (2405). Parameters with respect to a WUR mode operation of the STA may be determined and exchanged through negotiation.

The STA enters the WUR mode (2410). For example, the STA may operate in the WUR duty cycle mode in which a WUR on duration and a WUR off duration are alternate and may perform WUR monitoring in the WUR duty cycle mode.

The STA receives a first wake-up frame through WUR (wake-up radio) (e.g., through WURx) (2415). The first wake-up frame may be a broadcast wake-up frame but the present disclosure is not limited thereto.

The STA may monitor primary connectivity radio (PCR) based on reception of the first wake-up frame. For example, the STA may maintain WUR monitoring for a predetermined period while monitoring PCR. However, when the STA detects a second wake-up frame indicating transmission of unicast data (e.g., PCR unicast data) through WUR or succeeds in transmitting an uplink (UL) PCR frame to the access point (AP), the STA can end WUR monitoring even before the predetermined period has elapsed. The duration of the predetermined period may be determined through negotiation (2405) between the STA and the AP. For example, the AP may negotiate with the STA about an operation of the STA to maintain WUR monitoring while monitoring PCR for a predetermined period after wake-up before entering the WUR mode.

The second wake-up frame for indicating unicast data transmission may be one of an individually addressed wake-up frame (e.g., a wake-up frame including the WUR ID of the corresponding STA which is allocated by the AP to an addressed field), a group wake-up frame (e.g., a wake-up frame including a group ID allocated by the AP to the addressed field) and a wake-up frame including multiple WIDs in a frame body.

When the STA has received a response frame for a UL PCR frame, the STA may determine that the UL PCR frame has been successfully transmitted. The UL PCR frame may be a PS-poll frame or a QoS null frame but the present disclosure is not limited thereto.

The AP transmits a PCR beacon frame through primary connectivity radio (PCR) to the STA which wakes up based on transmission of the first wake-up frame (2430). The STA receives the PCR beacon frame through PCR. (2430). The STA receives the PCR beacon frame through PCR.

When unicast data to be transmitted to the STA is generated between the first wake-up frame and the PCR beacon frame (2420), the AP may transmit the second wake-up frame through WUR to the STA which wakes up and monitors PCR (2425). For example, the second wake-up frame may be used for the unicast data generated between the first wake-up frame and the PCR beacon frame. When the STA operates in the WUR duty cycle mode in which a WUR on duration and a WUR off duration are alternately repeated, the AP may transmit a unicast WUR frame when the STA in a WUR on duration.

After transmission of the second wake-up frame (2425), the AP may transmit unicast data to the STA through PCR (2435).

Figure 25:
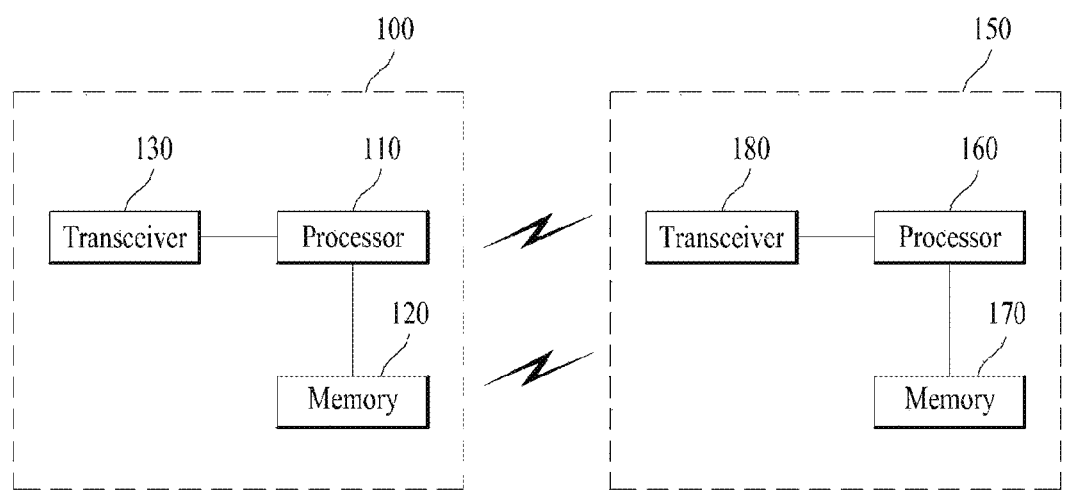
FIG. 25 is a diagram illustrating a device according to an embodiment of the present disclosure.

FIG. 25 is a diagram illustrating a device for implementing the above-described method.

In FIG. 25, a wireless device 100 may correspond to the aforementioned specific STA and a wireless device 150 may correspond to the aforementioned AP.

The STA 100 may include a processor 110, a memory 120 and a transceiver 130 and the AP 150 may include a processor 160, a memory 170 and a transceiver 180. The transceivers 130 and 180 may transmit/receive RF signals and may be executed in the physical layer of IEEE 802.11/3GPP and the like. The processors 110 and 160 are executed in the physical layer and/or the MAC layer and connected to the transceivers 130 and 180.

The processors 110 and 160 and/or the transceivers 130 and 180 may include application-specific integrated circuits (ASICs), other chipsets, logic circuits and/or data processors. The memories 120 and 170 may include a read-only memory (ROM), a random access memory (RAM), a flash memory, a memory card, a storage medium and/or other storage units. When an embodiment is executed by software, the above-described method may be implemented as modules (e.g., processors and functions) which execute the above-described functions. The modules may be stored in the memories 120 and 170 and executed by the processors 110 and 160. The memories 120 and 170 may be provided inside or outside the processors 110 and 160 and connected to the processors 110 and 160 through known means.

The transceiver 130 of the STA may include a transmitter (not shown) and a receiver (not shown). The receiver of the STA may include a primary connectivity radio receiver for receiving a primary connectivity radio (e.g., WLAN such as IEEE 802.11a/b/g/n/ac/ax) signal and a WUR receiver for receiving a WUR signal. The transmitter of the STA may include a primary connectivity radio transmitter for transmitting a primary connectivity radio signal.

The transceiver 180 of the AP may include a transmitter (not shown) and a receiver (not shown). The transmitter of the AP may correspond to an OFDM transmitter. The AP may transmit a WUR payload according to OOK by reusing the OFDM transmitter. For example, the AP may OOK-modulate the WUR payload through the OFDM transmitter, as described above.

The detailed description of the preferred embodiments of the present disclosure has been given to enable those skilled in the art to implement and practice the present disclosure. Although the present disclosure has been described with reference to the preferred embodiments, those skilled in the art will appreciate that various modifications and variations can be made in the present disclosure without departing from the spirit or scope of the present disclosure described in the appended claims. Accordingly, the present disclosure should not be limited to the specific embodiments described herein, but should be accorded the broadest scope consistent with the principles and novel features disclosed herein.

INDUSTRIAL APPLICABILITY

The present disclosure can be applied to various wireless communication system including IEEE 802.11.

The invention claimed is:

1. A method used in a wireless local area network (WLAN), the method performed by a station (STA) and comprising:
   entering a wake-up radio (WUR) on state in which the STA is able to receive a WUR frame;
   receiving a WUR wake-up frame from an access point (AP) during the WUR on state;
   turning on a primary connectivity radio (PCR) of the STA based on the WUR wake-up frame; and
   determining to enter a WUR off state from the WUR on state based on whether the STA completes a frame exchange with the AP through the PCR.

2. The method of claim 1, wherein the STA enters the WUR off state after the STA completes the frame exchange with the AP.

3. The method of claim 1, wherein the STA maintains the WUR on state before the STA completes the frame exchange with the AP.

4. The method of claim 1, wherein the WUR on state is followed by the WUR off state.

5. The method of claim 1, wherein the STA includes a WUR receiver supporting the WUR on state and the WUR off state, wherein the STA does not receive the WUR frame during the WUR off state.

6. The method of claim 1, wherein the STA includes a PCR transceiver supporting a PCR on state and a PCR off state, wherein the STA enters the PCR on state after receiving the WUR wake-up frame.

7. The method of claim 1, wherein the WUR wake-up frame is modulated based on on-off keying (OOK) scheme.

8. The method of claim 1, wherein the frame exchange is related to transmitting a first PCR frame to the AP and receiving a second PCR frame from the AP.

9. A station (STA) in a wireless local area network (WLAN), comprising:
   a transceiver including a wake-up radio (WUR) receiver and a primary connectivity radio (PCR) transceiver; and
   a processor configured to control the transceiver,
   wherein the processor is further configured to:
      enter a WUR on state in which the WUR receiver is able to receive a WUR frame;
      receive, via the WUR receiver, a WUR wake-up frame from an access point (AP) during the WUR on state;
      turn on the PCR transceiver based on the WUR wake-up frame; and
      determine to enter a WUR off state from the WUR on state based on whether the STA completes a frame exchange with the AP through the PCR.

10. The STA of claim 9, wherein the processor is further configured to enter the WUR off state after the STA completes the frame exchange with the AP.

11. The STA of claim 9, wherein the processor is further configured to maintain the WUR on state before the STA completes the frame exchange with the AP.

12. The STA of claim 9, wherein the WUR on state is followed by the WUR off state.

13. The STA of claim 9, wherein the WUR wake-up frame is modulated based on on-off keying (OOK) scheme.

14. The STA of claim 9, wherein the frame exchange is related to transmitting a first PCR frame to the AP and receiving a second PCR frame from the AP.

* * * * *